US008122442B2

(12) United States Patent
Lin

(10) Patent No.: US 8,122,442 B2
(45) Date of Patent: Feb. 21, 2012

(54) METHOD AND SYSTEM FOR ARRAY OPTIMIZATION

(75) Inventor: Jin Lin, San Jose, CA (US)

(73) Assignee: Oracle America, Inc., Redwood City, CA (US)

( * ) Notice: Subject to any disclaimer, the term of this patent is extended or adjusted under 35 U.S.C. 154(b) by 1057 days.

(21) Appl. No.: 12/023,061

(22) Filed: Jan. 31, 2008

(65) Prior Publication Data

US 2009/0199169 A1    Aug. 6, 2009

(51) Int. Cl.
*G06F 9/44* (2006.01)
*G06F 9/45* (2006.01)

(52) U.S. Cl. ................. 717/159; 717/149; 717/151

(58) Field of Classification Search .................. None
See application file for complete search history.

(56) References Cited

U.S. PATENT DOCUMENTS

| | | | | |
|---|---|---|---|---|
| 5,349,656 | A * | 9/1994 | Kaneko et al. | 718/102 |
| 5,613,117 | A * | 3/1997 | Davidson et al. | 717/159 |
| 5,836,014 | A * | 11/1998 | Faiman, Jr. | 717/159 |
| 6,078,745 | A * | 6/2000 | De Greef et al. | 717/151 |
| 6,088,511 | A * | 7/2000 | Hardwick | 717/149 |
| 6,421,668 | B1 * | 7/2002 | Yakhini et al. | 1/1 |
| 6,609,088 | B1 * | 8/2003 | Wuytack et al. | 703/22 |
| 6,745,384 | B1 * | 6/2004 | Biggerstaff | 717/156 |
| 7,290,253 | B1 * | 10/2007 | Agesen | 717/159 |
| 7,356,805 | B2 * | 4/2008 | Ding et al. | 717/128 |
| 7,496,908 | B2 * | 2/2009 | DeWitt et al. | 717/159 |
| 7,571,432 | B2 * | 8/2009 | Heishi et al. | 717/151 |
| 7,590,975 | B1 * | 9/2009 | Shapiro | 717/130 |
| 7,739,662 | B2 * | 6/2010 | Bouguet et al. | 717/124 |
| 7,805,708 | B2 * | 9/2010 | Jeremiassen | 717/128 |
| 7,889,976 | B2 * | 2/2011 | Ben-Romdhane et al. | 715/700 |
| 2004/0249809 | A1 * | 12/2004 | Ramani et al. | 707/4 |
| 2007/0074195 | A1 * | 3/2007 | Liao et al. | 717/160 |
| 2007/0180440 | A1 * | 8/2007 | Pechanek | 717/159 |
| 2011/0154289 | A1 * | 6/2011 | Mannarswamy et al. | 717/159 |

OTHER PUBLICATIONS

Olga Golvanevsky, Ayal Zaks, "Struct-reorg: current status and future perspectives", Jul. 2007, GCC Developer's Summit; [retrieved from Internet]; Retrieved from Internet <URL:http://citeseerx.ist.psu.edu/viewdoc/download?doi=10.1.1.66.1330&rep=rep1&type=pdf#page=47>;pp. 47-56.*
Various authors, "Proceedings of the GCC DEvelopers Summit", Jul. 2007, GCC Developer's Summit; [retrieved from Internet]; Retrieved from Internet<URL:http://citeseerx.ist.psu.edu/viewdoc/download?doi=10.1.1.66.1330&rep=rep1&type=pdf#page=47>;pp. 1-162.*

(Continued)

*Primary Examiner* — Thuy Dao
*Assistant Examiner* — Xi D Chen
(74) *Attorney, Agent, or Firm* — Osha · Liang LLP

(57) ABSTRACT

A method for transforming access to a structure array, that includes compiling source code, wherein compiling the source code includes identifying the structure array in the source code, performing an object safety analysis to determine whether the structure array is safe for transformation, wherein the object safety analysis includes an inter-procedural alias class analysis, performing a profitability analysis on the structure array when the structure array is safe for transformation, wherein the profitability analysis includes selecting a transformation from a plurality of transformations, wherein the plurality of transformations includes a pointer based fully splitting transformation, a pointer based partially splitting transformation, and an address based fully splitting transformation, and performing the selected transformation on the structure array, and storing the compiled code.

17 Claims, 18 Drawing Sheets

OTHER PUBLICATIONS

Chen Ding, Ken Kennedy, "Inter-array Data Regrouping", 2000 Springer-Verlag Berlin Heidelberg; [retrieved from Internet]; Retrieved from Internet<URL:http://www.springerlink.com/content/hd0f0getyrvwrwxg/fulltex.pdf>; pp. 149-163.*

Fu, et al., "Data-Layout Optimization Using Reuse Distance Distribution", 2006, EUC Workshops 2006; [retrieved from Internet]; Retrieved from Internet<URL:http://www.springerlink.com/content/k1410428382381h4/fulltex.pdf>; pp. 858-867.*

Zhu, et al., "Locality Analysis for Parallel C Programs", 1997 IEEE; [retrieved on Dec. 14, 2011]; Retrieved from Internet <URL:http://ieeexplore.ieee.org/stamp/stamp.jsp?tp=&arnumber=643999>;pp. 2-13.*

Culler, et al., "Parallel Programming in Split-C", 1993 ACM; [retrieved on Dec. 14, 2011]; Retrieved from Internet <URL:http://ieeexplore.ieee.org/stamp/stamp.jsp?tp=&arnumber=1263470>;pp. 262-273.*

Ladelsky, R.; "Matrix Flattening and Transposing in GCC" Abstract; 2006 GCC Developers' Summit, Jun. 28-30, 2006, Ottawa, Canada (1 page).

Hagog, M. et al.; "Cache Aware Data Layout Reorganization Optimization in GCC"; Proceedings of the GCC Developers' Summit, 2005; pp. 69-92.

Zhao, P. et al.; "Forma: A Framework for Safe Automatic Array Reshaping"; ACM Transactions on Documents Formatting, 2005; pp. 1-29.

Steensgaard, B.; "Points-to Analyss in Almost Linear Time"; Proceedings of the 23rd Annual ACM SIGPLAN-SIGACT Symposium on Principles of Programming Languages, 32-41; 1996; pp. 32-41.

Steensgaard, B.; "Points-to Analysis by Type Inference of Programs with Structures and Unions"; Prooceedings of the 6th International Conference on Compiler Construction, 1996; pp. 136-150.

Zhong, Y. et al.; "Array Regouping and Structure Splitting Using Whole-Program Reference Affinity"; Proceedings of the 2004 ACM SIGPLAN Conference on Programming Language Design and Implementation, 2004; pp. 255-266.

Kistler, T. et al.; "Automated Data-Member Layout of Heap Objects to Improve Memory-Hierarchy Performance"; ACM Transactions on Programming Language and Systems, vol. 22, No. 3, May 2000; pp. 490-505.

McIntosh, N. et al.; "Whole-Program Optimization of Global Variable Layout"; Proceedings of the 15th International Conference on Parallel Architectures and Compilation, 2006, pp. 164-172.

Kennedy, K.; "Fast Greedy Weighted Fusion"; 111th International Conference on Supercomputing, 2000, pp. 131-140.

Hundt, R. et al.; "Practical Structure Layout Optimization and Advice"; Proceedings of the International Symposium on Code Generation and Optimization, 2006; pp. 233-244.

Lam, M.; "A Data Locality Optimizing Algorithm"; ACM SIGPLAN, SIGPLAN Notices, 2003; pp. 442-459.

Raman, E. et al.; "Structure Layout Optimization for Multithreaded Programs"; Proceedings of the International Symposium on Code Generation and Optimization, 2007; pp. 271-282.

* cited by examiner

US 8,122,442 B2

METHOD AND SYSTEM FOR ARRAY OPTIMIZATION

BACKGROUND

Computers are designed to execute computer programs written in a format understood by the computer, such as machine code. However, programmers typically do not write computer programs in machine code. Instead, programmers typically write computer programs using human readable programming languages (e.g., JAVA™ (JAVA™ is a trademark of Sun Microsystems, Inc.), C, C++, C#, etc.). The resulting computer program is then compiled to generate a computer program in a format understood by the computer.

The process of compilation is performed by a compiler. Compilers typically use the source code (e.g., computer program written in a human readable programming language) as input and generate object code, which is able to be transformed by another program into an executable (e.g., a format understood by the computer). When compiling a program, the compiler may perform various steps for optimization of the object code. For example, the compiler may optimize the object code for memory usage, execution efficiency, and/or the target computer system upon which the object code will execute.

For example, consider the scenario in which a program has a two-dimensional array of integers. Further, in the example, the source code of the program includes instructions for adding "1" to each integer in the two-dimensional array. Specifically, the source code may include an inner loop that iterates through the rows of the two-dimensional array, and an outer loop that iterates through the columns of the two-dimensional array. In order to optimize the program for memory locality when the array is stored with elements in the same column adjacent in memory (i.e., column major order), the compiler may change the order of the two loops, such that the inner loop iterates through the columns and the outer loop iterates through the rows of the two-dimensional array. The compiler may also perform loop unrolling by removing the inner and outer loop and specifying each of the instructions of the loop. Thus, the resulting executable may take less time to execute than an executable created if the source code were transformed directly (i.e., without optimization).

Compiler optimization eases the development of a program. In particular, a programmer may develop source code without worrying about execution efficiency or memory usage or the particular computer system that will execute the compiled source code and allow the compiler to perform appropriate optimizations. Therefore, improvements in compiler optimizations techniques are desirable.

SUMMARY

In general, in one aspect, the invention relates to a method for transforming access to a structure array, that includes compiling source code, wherein compiling the source code includes identifying the structure array in the source code, performing an object safety analysis to determine whether the structure array is safe for transformation, wherein the object safety analysis includes an inter-procedural alias class analysis, performing a profitability analysis on the structure array when the structure array is safe for transformation, wherein the profitability analysis includes selecting a transformation from a plurality of transformations, wherein the plurality of transformations includes a pointer based fully splitting transformation, a pointer based partially splitting transformation, and an address based fully splitting transformation, and performing the selected transformation on the structure array, and storing the compiled code.

In general, in one aspect, the invention relates to a computer system, that includes a processor, a memory, and instructions stored in memory for causing the computer system to compile source code, wherein compiling the source code includes identifying a structure array in the source code, performing an object safety analysis to determine whether the structure array is safe for transformation, wherein the object safety analysis includes an inter-procedural alias class analysis, performing a profitability analysis on the structure array when the structure array is safe for transformation, wherein the profitability analysis includes selecting a transformation from a plurality of transformations, wherein the plurality of transformations includes a pointer based fully splitting transformation, a pointer based partially splitting transformation, and an address based fully splitting transformation, and performing the selected transformation on the structure array, and store the compiled code.

In general, in one aspect, the invention relates to a computer readable medium that includes computer readable program code embodied therein for causing a computer system to compile source code, wherein compiling the source code includes identifying a structure array in the source code, performing an object safety analysis to determine whether the structure array is safe for transformation, wherein the object safety analysis includes an inter-procedural alias class analysis, performing a profitability analysis on the structure array when the structure array is safe for transformation, wherein the profitability analysis includes selecting a transformation from a plurality of transformations, wherein the plurality of transformations includes a pointer based fully splitting transformation, a pointer based partially splitting transformation, and an address based fully splitting transformation, and performing the selected transformation on the structure array, and store the compiled code.

Other aspects of the invention will be apparent from the following description and the appended claims.

DETAILED DESCRIPTION

Figure 1:
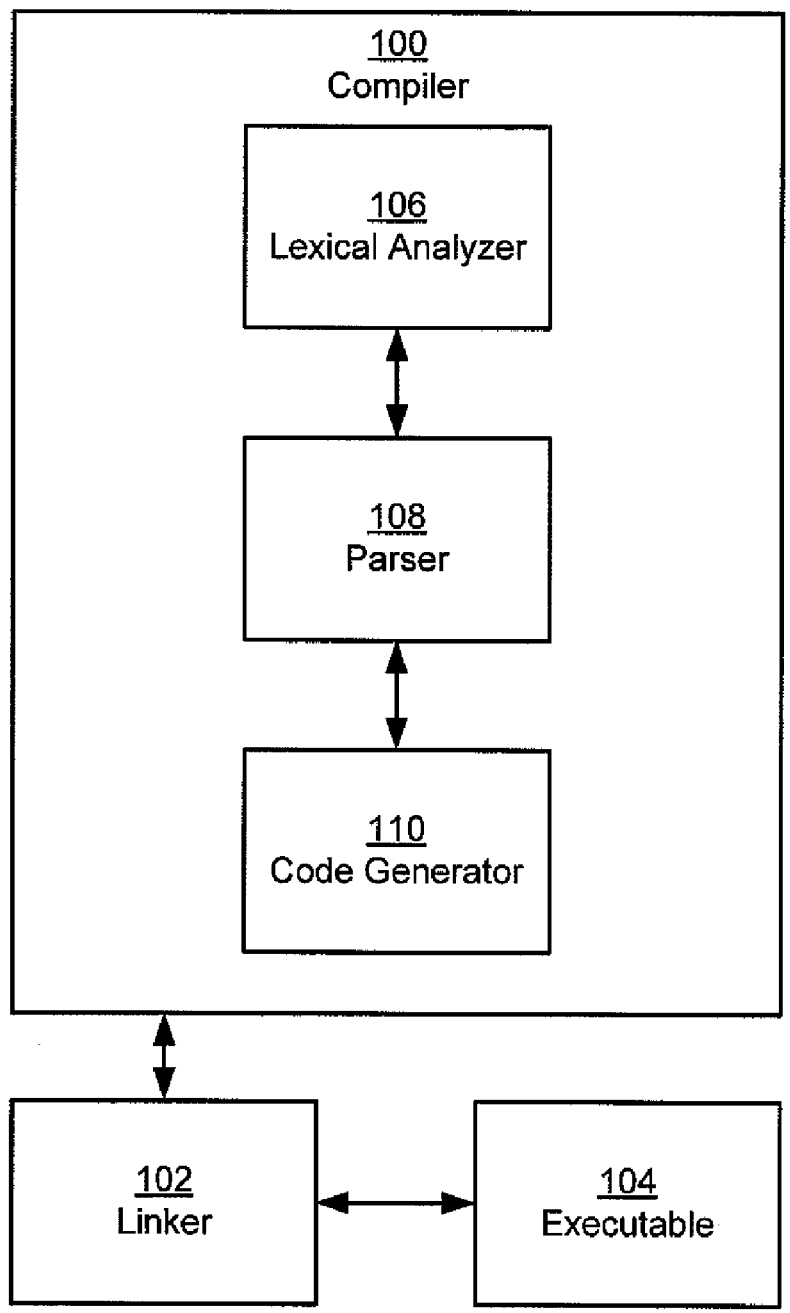
FIG. 1 shows a schematic diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system to transform structure array accesses using optimization techniques during compilation. Specifically, embodiments of the invention provide a framework for transforming the memory layout of data in a structure array. More specifically, embodiments of the invention perform a safety check analysis to determine whether a structure array is safe for transformation, perform a profitability analysis to determine how to transform the structure array, and then perform the transformation. The transformation may include reordering data in structure arrays stored in memory to account for the order in which data in the structure arrays is accessed by a program.

A structure array is an array of structures in accordance with one or more embodiments of the invention. An array is an ordered group of elements in accordance with one or more embodiments of the invention. In a structure array, each element is a structure. A structure is an aggregation of multiple fields that can be manipulated as a single unit or individually. A field is a storage unit for data of a specific data type. For example, the data type may be an integer, a float, a struct, a character, a pointer to another data element or array, or any other data type. The fields in the structure may have heterogeneous or homogeneous data types depending on the requirements of the program. For example, a structure named "family member" may exist that has fields for a name, a birthday, and a reference to another structure array having "family member" structures for the family member's children. In the example, the structure may have a String field for the name, an Integer field for the birthday, and a pointer field to reference another structure array for the family member's children.

FIG. 1 shows a schematic diagram of a system in accordance with one or more embodiments of the invention. As shown in FIG. 1, the system includes a compiler (100), a linker (102), and an executable (104). Each of these components is described in detail below.

A compiler (100) is a program that includes functionality to transform source code into object code. Source code is any sequence of statements or declarations that are written in a human readable programming language. For example, the source code may be written in JAVA™, FORTRAN, C, C++, C#, or any other such programming language. In one or more embodiments of the invention, the source code includes instructions defining a structure and instructions defining a structure array. The instructions defining the structure array may or may not specify the number of elements in the structure array when the program is executed.

One or more embodiments of the invention transform accesses to arrays in a program. The source code of the program may define a variety of types of arrays. The types of arrays may include a structure array and a pointer array. As discussed above, a structure array is an array of structures. Similarly, a pointer array is an array of pointers. A pointer is data stored in a memory location that contains a reference to another memory location.

In addition to defining types of arrays, the source code may also define a relationship between the arrays and another data element (e.g., a pointer, another array, a data structure, or any other data element). For example, the source code may define the structure in the structure array as having a field which is a pointer that references (i.e., points to) another array. In the example, the structure array, as a whole, references multiple arrays. In another example, the structure array may be referenced by a pointer that may or may not be in an array or in a structure. The pointer referencing the structure array may be referenced by another pointer. Additionally, in another example, pointers in a pointer array may reference the same or unique data elements as other pointers in the pointer array.

The compiler (100), discussed below, accounts for the different possible definitions of arrays and relationships between the arrays and other data elements when transforming accesses to the arrays.

In one or more embodiments of the invention, the compiler (100) includes a lexical analyzer (106), a parser (108), and a code generator (110). A lexical analyzer (106) includes functionality to iterate through the source code and identify tokens from the source code. A token is an indivisible block of characters, such as a keyword, variable, a punctuation mark, an operator, etc. Specifically, when a token is divided, the parts of the token are meaningless. For example, if the source code includes the statement "cows=32+horses;", then the lexical analyzer may identify the tokens as "cows", "=", "32", "+", "horses", and ";". Typically, the programming language includes a specification specifying the possible character sequences that may be tokens.

Continuing with FIG. 1, the lexical analyzer (106) is connected to a parser (108) in accordance with one or more embodiments of the invention. A parser (108) includes functionality to transform the sequence of tokens into a data structure, such as a parse tree, that captures the order of operations required by the source code.

In one or more embodiments of the invention, the code generator (110) includes functionality to use the data structure to optimize the program. In one or more embodiments of the invention, the optimization includes transforming the memory layout of the structure array when the program is executed. In particular, in one or more embodiments of the invention, the code generator includes functionality to identify a structure array in the source code that is safe to transform for optimization, determine whether transforming the structure array is profitable, and perform the transformation.

In one or more embodiments of the invention, identifying a structure array in the source code that is safe to transform is performed using an object safety analysis. In one or more embodiments of the invention, the object safety analysis is a field insensitive interprocedural alias class analysis. Alias class analysis determines whether a memory location in the program's memory (e.g., a structure array) is referenced by different pointers in the program's memory. Specifically, alias class analysis divides the program's memory into alias classes. Alias classes are disjoint sets of memory that cannot be aliases or reference one another. In one or more embodiments of the invention, the alias classes include bottom classes, scalar classes, array classes, blank classes, structure classes, and lambda classes. The bottom class represents unknown objects. The scalar class indicates the objects may be a scalar, such as a structure field or an array element. The array class represents array objects. The structure class represents structure objects. The lambda class is used to describe a function including the return type and the formal parameters of the function. The global scalar class is a default class. Specifically, if the alias class analysis cannot determine where a pointer points to at the end of the alias class analysis, the pointer will reference the default global scalar class. The field insensitive interprocedural alias class analysis is described in more detail below in reference to FIG. 3.

In one or more embodiments of the invention, the code generator may include functionality to perform different optimization techniques on a structure array, thereby transforming the structure array. The different optimization techniques include fields reordering, structure splitting, and array collapse. In one or more embodiments of the invention, fields reordering is an optimization technique in which the fields of each structure of a structure array are reordered according to the frequency at which each field is accessed in the program.

For example, consider the scenario in which a structure has three fields, $f_1$, $f_2$, and $f_3$. Further, the source code defines the order of the fields as ($f_1$, $f_2$, $f_3$). In the example, if the frequency that $f_2$ is accessed is greater than the frequency that $f_1$ is accessed, and the frequency that $f_1$ is accessed is greater than the frequency that $f_3$ is accessed, then the fields reordering may rearrange the order of the fields to ($f_2$, $f_1$, $f_3$) for each structure in the structure array.

In the structure splitting optimization technique, elements of the structure array are partitioned. The partitioned parts of the structure are grouped with the same partitioned parts of other structures in the structure array. Specifically, each structure in the structure array is partitioned into partitioned parts. Each partitioned part includes a subset of the fields from each structure. The partitioned parts of the same structure are non-adjacent, and therefore split, in memory.

In one or more embodiments of the invention, the structure splitting may be fully splitting or partially splitting. Structure fully splitting modifies the structure array such that each structure is partitioned according to the fields in the structure, and the same fields from each structure are grouped. For example, a fully split structure array has all of the first fields of each structure in the structure array grouped, all of the second fields of each structure in the structure array grouped, etc. Thus, when the structure array is allocated, the first fields of each structure are allocated in adjacent memory locations, the second fields of each structure are allocated in adjacent memory locations, etc.

Structure partially splitting partitions the fields of each structure in the structure array into at least two groups. Fields are divided into the groups depending on access counts for the fields. For example, in structure partially splitting where two groupings are used, all of the fields of each structure that are frequently accessed are grouped and all of the fields of each structure that are infrequently accessed are grouped such that when the structure array is allocated, the fields in each group are allocated in adjacent memory locations.

For example, consider the scenario in which structure S has three fields: $f_1$, $f_2$, and $f_3$. Further, in the example, the structure array is an array of three elements x, y, and z in which each element is of type structure S. The first structure in the structure array has fields ($f_{1x}$, $f_{2x}$, $f_{3x}$), the second structure in the structure array is ($f_{1y}$, $f_{2y}$, $f_{3y}$), and the third structure in the structure array is ($f_{1z}$, $f_{2z}$, $f_{3z}$). Thus, the source code orders the elements as follows: ($f_{1x}$, $f_{2x}$, $f_{3x}$, $f_{1y}$, $f_{2y}$, $f_{3y}$, $f_{1z}$, $f_{2z}$, $f_{3z}$). Structure fully splitting orders the elements as follows: ($f_{1x}$, $f_{1y}$, $f_{1z}$, $f_{2x}$, $f_{2y}$, $f_{2z}$, $f_{3x}$, $f_{3y}$, $f_{3z}$). Structure partially splitting may order the elements as any of the following: ($f_{1x}$, $f_{2x}$, $f_{1y}$, $f_{2y}$, $f_{1z}$, $f_{2z}$, $f_{3x}$, $f_{3y}$, $f_{3z}$), ($f_{1x}$, $f_{3x}$, $f_{1y}$, $f_{3y}$, $f_{1z}$, $f_{3z}$, $f_{2x}$, $f_{2y}$, $f_{2z}$), ($f_{2x}$, $f_{3x}$, $f_{2y}$, $f_{3y}$, $f_{2z}$, $f_{3z}$, $f_{1x}$, $f_{1y}$, $f_{1z}$), etc.

In the array collapse optimization technique, multiple arrays are collapsed into a single array. The arrays may be referenced by a structure array, a pointer array, or by a sequence of pointers. When the arrays are referenced by a structure array, at least one field of each structure in the structure array references another array. Thus, the structure array, as a whole, references multiple arrays that may be collapsed into a single array. The single array may be collapsed into a separate array apart from the structure array or collapsed into the same array as the structure array. Similarly, pointers in a pointer array may reference multiple different arrays. Again, array collapse may be used to collapse the multiple different arrays into a single array. Further, in one or more embodiments of the invention, the multiple arrays referenced by the structure array or the pointer array may be fully split in a manner that the first element of the arrays is grouped followed by the second element of the arrays, etc.

Additionally, array collapse may also include pointer level dereferencing when a chain of pointers points to an array. For example, consider the scenario in which Pointer $P_1$ points to Pointer $P_2$ which points to Pointer $P_3$ which points to structure array S. In the example, pointer level dereferencing may transform the program such that Pointer $P_1$ points directly to the structure array S.

In one or more embodiments of the invention, the code generated by a compiler (100) is object code. Object code includes computer instructions that are understandable by a computer system. A linker (102) includes functionality to generate an executable (104) from the object code. In one or more embodiments of the invention, the executable (104) includes program instructions in a format that can be understood by a computer. Specifically, in one or more embodiments of the invention, the executable (104) may be executed by a computer. The executable (104) may be stored in memory (not shown) when executed. The executable (104) may also be stored in a data repository (e.g., a file system) until executed.

FIGS. 2-6 show flowcharts in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel. In addition, steps have been omitted to simplify the presentation.

Figure 2:
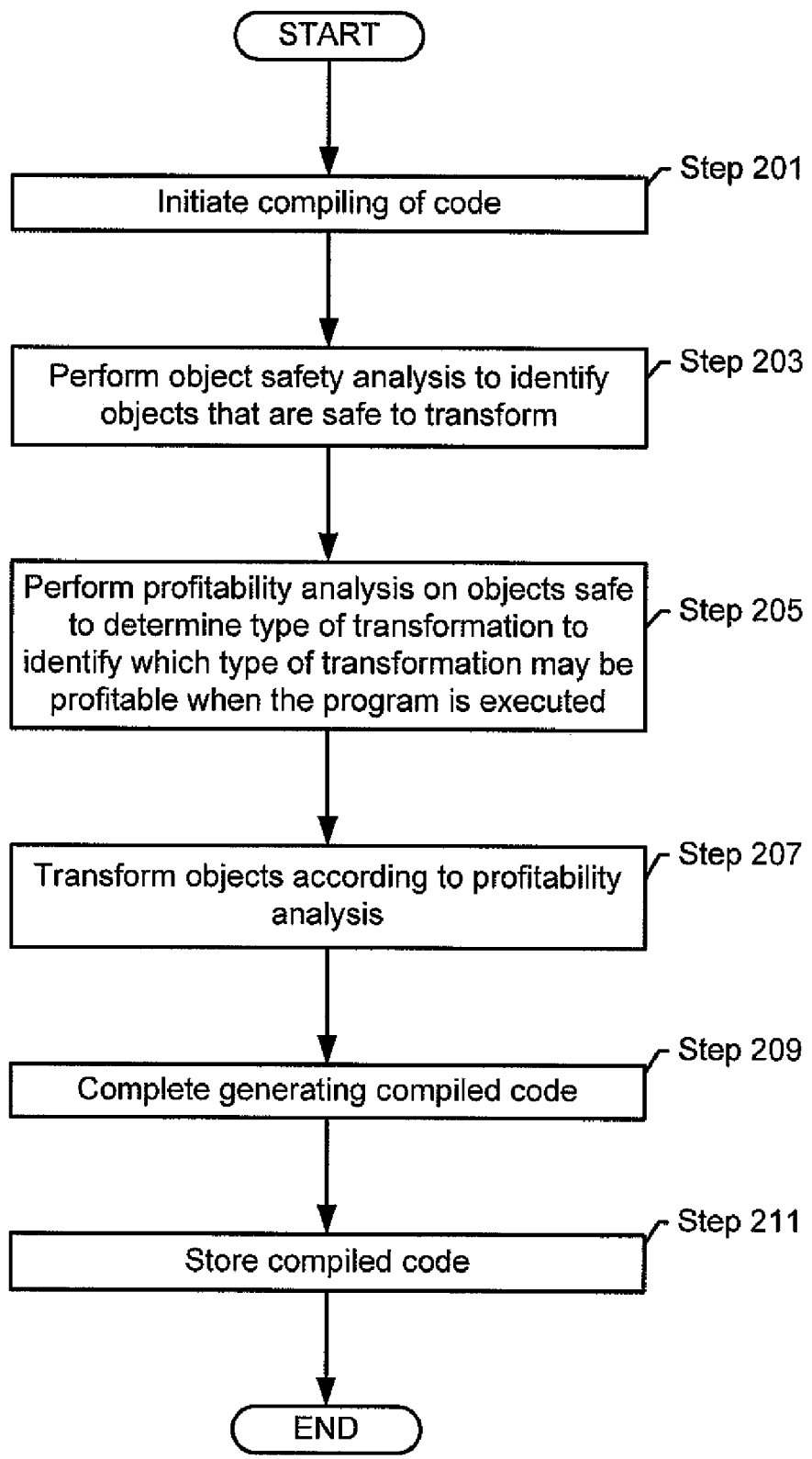
FIGS. 2-6 shows flowcharts of a method in accordance with one or more embodiments of the invention.

FIG. 2 shows an overview for compiling source code in accordance with one or more embodiments of the invention. Initially, compiling of the source code is initiated (Step 201). Initiating compilation of the source code may include performing the lexical analysis and parsing the source code.

Next, an object safety analysis is performed on the program to identify objects that are safe to transform (Step 203). For example, arrays (e.g., pointer arrays and structure arrays) and pointers to arrays that are safe to transform may be identified from the object safety analysis. In one or more embodiments of the invention, the object safety analysis may be field insensitive interprocedural alias class analysis. Field insensitive interprocedural alias class analysis is explained in more detail below in reference to FIG. 3. As discussed above, alias class analysis identifies alias classes for each of the objects. Objects that are in specific alias classes after the object safety analysis, such as an array class or a structure class, are determined to be safe to transform.

Continuing with FIG. 2, a profitability analysis is performed on objects found to be safe for transformation to identify which type of transformation may be profitable (Step 205). At this stage, if an object such as a structure array or pointer array is determined to be safe to transform, the profitability analysis is performed on the structure array or the pointer array. The profitability analysis is described in more detail below in reference to FIGS. 4-6.

Based on the identified type of transformation, the objects are transformed according to the profitability analysis (Step 207). In one or more embodiments of the invention, the transformation of objects may occur while performing the profitability analysis. Specifically, objects that are identified as safe to transform are transformed.

Once objects are transformed, generation of compiled code is completed (Step 209). Completing generation of compiled code may include performing any additional optimization techniques, or performing any other steps known in the art for completing the compilation process.

In one or more embodiments of the invention, the result of compilation includes compiled code. The compiled code is stored in accordance with one or more embodiments of the invention (Step 211). At this stage, an executable may be created from the compiled code and the program may be executed. In the process of executing the program, a transformed structure array may be allocated in memory. For example, if the optimization technique applied to the structure array is structure fully splitting, the structure array is allocated in memory such that the same fields in different structures of the structure array are adjacent in memory. Thus, the optimization technique defines how the data in the structure array is allocated and accessed in memory when the program is executed in accordance with one or more embodiments of the invention.

Figure 3:
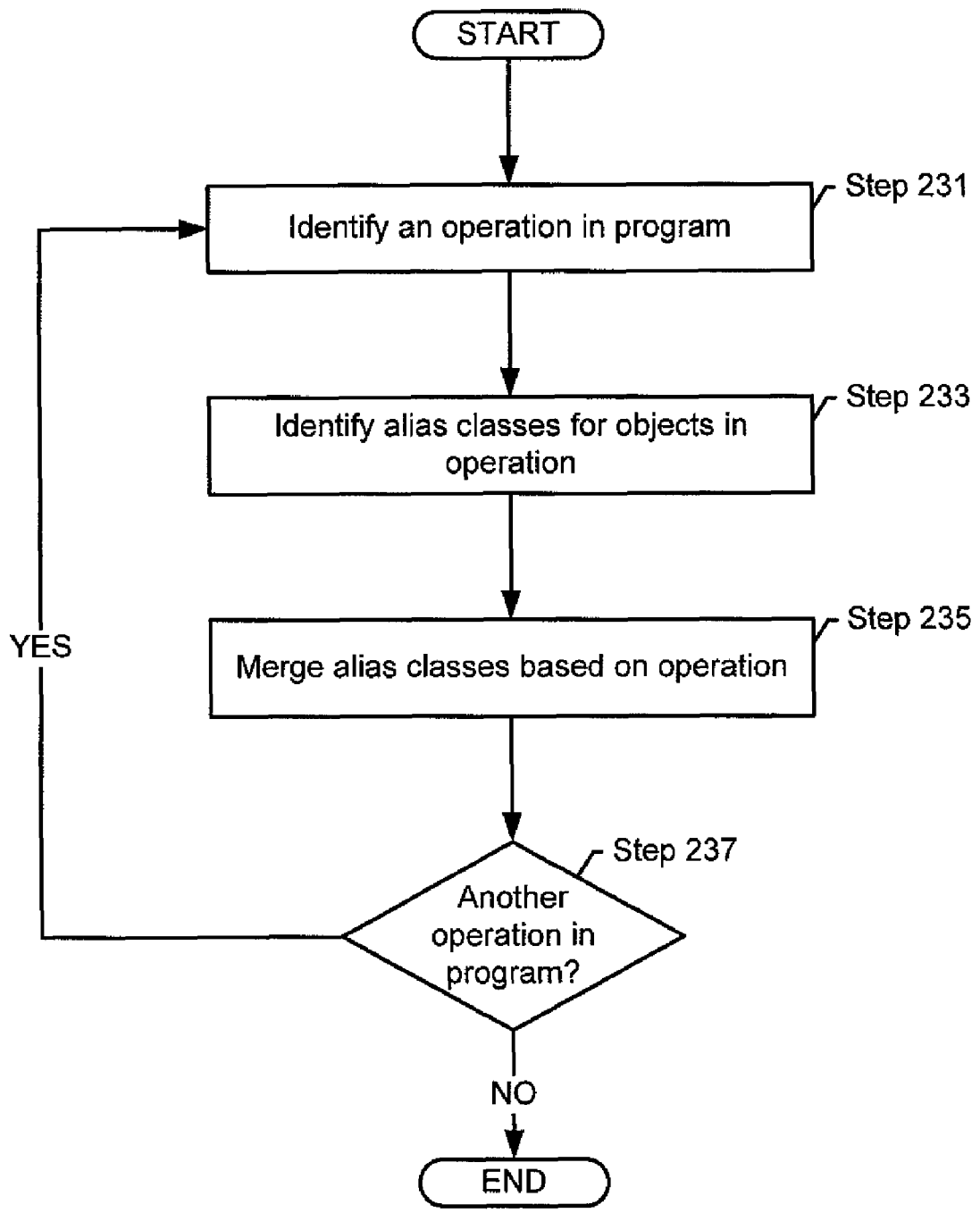

FIG. 3 shows a flowchart of a method for performing object safety analysis in accordance with one or more embodiments of the invention. Object safety analysis identifies an alias class for each object in the program. The resulting alias class defines whether an object is safe to transform. For example, a structure that is in the structure class after object safety analysis is performed is safe to transform. In contrast, a structure that is in the scalar class after object safety analysis is determined to be unsafe for transformation. Thus, although the initial alias class for the structure is the structure class, the object safety analysis may exclude the structure from transformation by changing the alias class from the structure class to a scalar class.

In one or more embodiments of the invention, the object safety analysis is performed by iterating through operations, such as assignment statements, function calls, declarations, etc. in the program. In one or more embodiments of the invention, the object safety analysis is performed in a single pass. Specifically, each operation is processed only once in the object safety analysis in accordance with one or more embodiments of the invention. Alternatively, a multi-pass object safety analysis may be performed.

Initially, an operation in the program is identified (Step 231). The operation may be any operation, such as a declaration, an assignment statement, a memory allocation request, or any other type of operation.

Next, the alias classes for the objects of the operation are identified (Step 233). The objects of the operation are the objects used by the operation, such as an array, a string, an integer, a structure, a user-defined object, and other such objects. In one or more embodiments of the invention, if the object has not been previously assigned an alias class, then the alias class for the object is the native alias class for the object type. For example, the first time a structure object is declared, the structure object is assigned to the structure class. In another example, a pointer object is assigned to the pointer class the first time a pointer is declared.

In one or more embodiments of the invention, the alias classes of the objects of the operation are merged (Step 235). Merging the alias classes may be performed, for example, according to the following.

In one or more embodiments of the invention, if the operation is adjusting a pointer to reference an array and the pointer is not set to reference the first element of the array, then the object safety analysis determines that the pointer can point to any element of the array. In such scenario, the array is assigned the scalar class. Further, even if the pointer references the first element of the array, if each array element is a pointer that does not reference a unique memory block, then the array is assigned the scalar class. An array that is assigned the scalar class is deemed unsafe for transformations.

In one or more embodiments of the invention, if a structure is defined with a structure field that is in itself a structure, the structure field is assigned a scalar class rather than a structure class. Further, if an unconventional use of the structure exists, then the structure is assigned a scalar class during the analysis. If the structure is assigned a scalar class, then the structure is deemed unsafe for transformation. Specifically, the structure object is excluded from structure layout optimization techniques, such as address based fully splitting, pointer based fully splitting, etc.

Further, if the operation is a function call to standard library function (e.g., fread) and a pointer to the structure is a parameter, the structure is assigned the lambda class. Therefore, the result of the function call is that the structure is determined to be unsafe for transformation.

Table 1 below shows situations for merging alias classes when a pointer changes from referencing a first object of a first alias class to referencing a second object of a second alias class. In Table 1 below, the columns represent the first object class referenced by a pointer. The rows represent a second object class referenced by the same pointer. The intersection of the row and the column defines the resulting alias class for each the two objects.

TABLE 1

|  | Bottom | Scalar | Array | Blank | Structure | Lambda |
| --- | --- | --- | --- | --- | --- | --- |
| Bottom | Bottom | Scalar | Array | Blank | Structure | Lambda |
| Scalar | Scalar | Scalar | Scalar | Scalar | Scalar | n/a |
| Array | Array | Scalar | Scalar | Array | Scalar/structure | n/a |
| Blank | Blank | Scalar | Scalar | Blank | Structure | n/a |
| Structure | Structure | Scalar | Scalar/structure | Structure | Structure/Scalar | n/a |
| Lambda | Lambda | n/a | n/a | n/a | n/a | Lambda |

For example, consider the scenario in which the code has a two-level pointer x. Specifically, x is a pointer that points to the first element of a pointer array, x[i] is a pointer that points to the first element of the $i^{th}$ array referenced by the pointer array, and x[i][j] is the $j^{th}$ element of the i array. The object safety analysis may create an array class for the array referenced by x and the array referenced by x[i]. If, after initialization of x[i], x[i] is changed to point to a different array other than the $i^{th}$ array referenced by the pointer array, then the array class for the array referenced by x is changed to a scalar class as denoted by Table 1 above. In such scenario, the array referenced by x is excluded from array collapse transformations.

Continuing with FIG. 3, a determination is made whether another unprocessed operation exists in the program (Step 237). If another unprocessed operation exists in the program, then the method repeats with Step 231. Otherwise, if another unprocessed operation does not exist in the code, then the object safety analysis is complete.

Figure 4A:
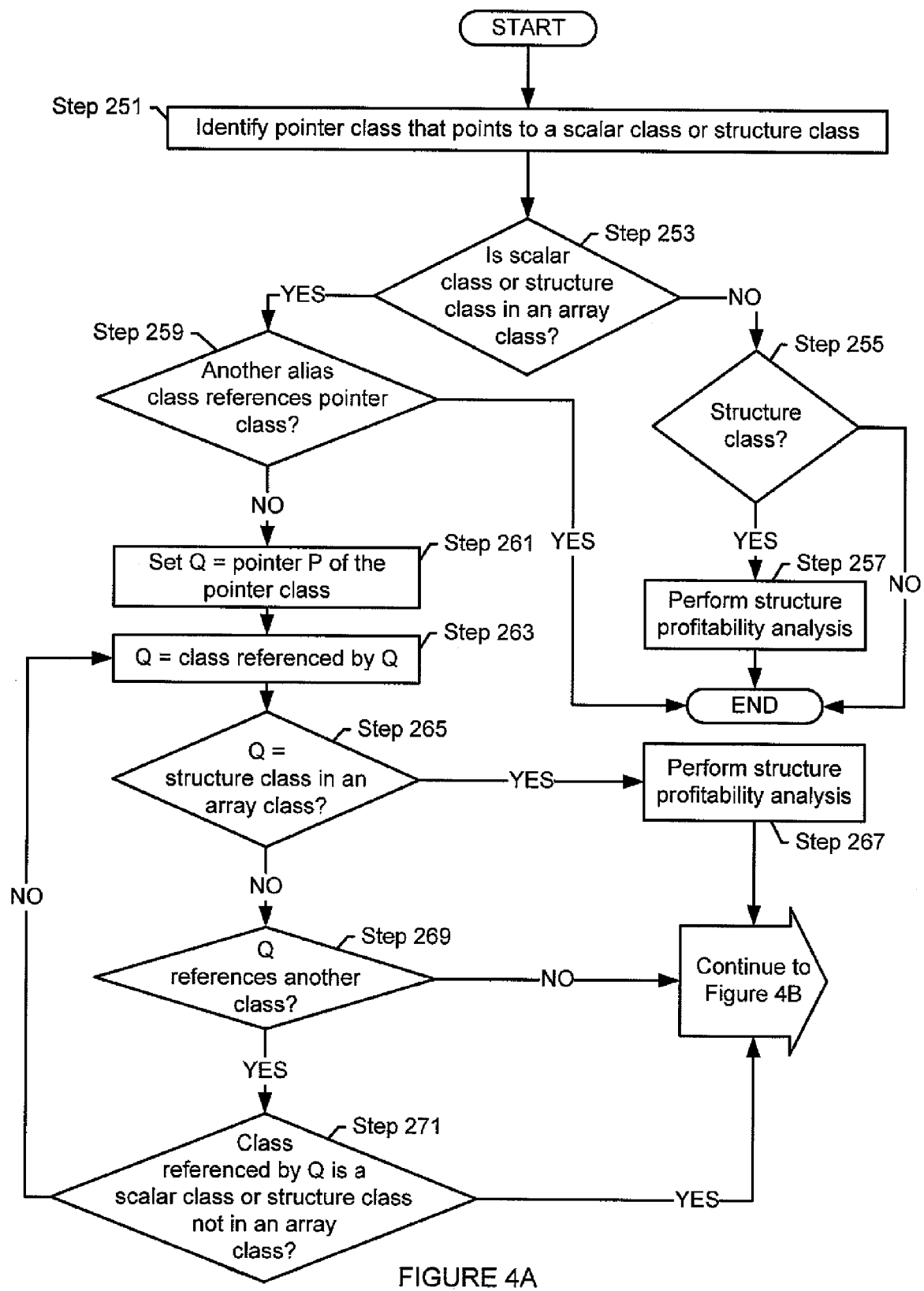
Figure 4B:
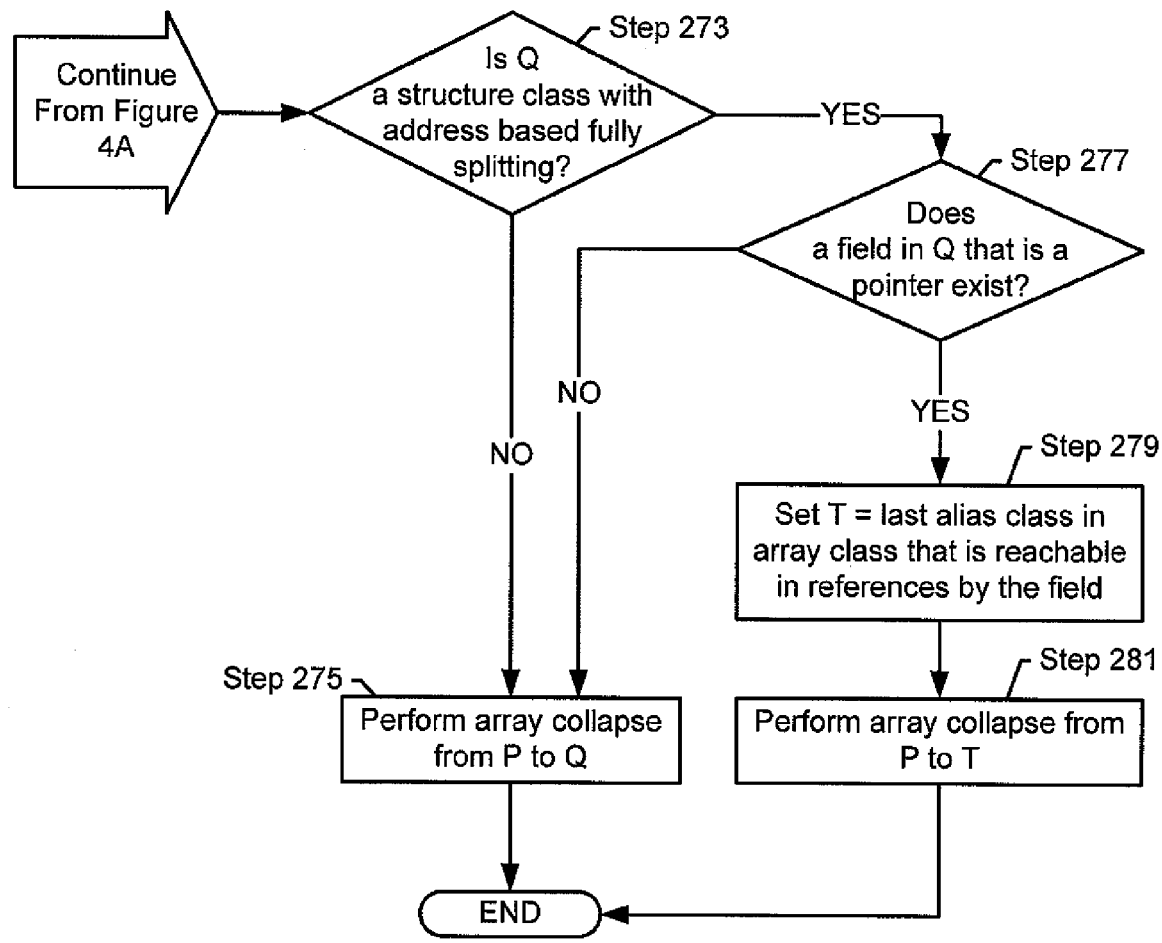

FIGS. 4A-4B show a flowchart of a method for performing a profitability analysis in accordance with one or more embodiments of the invention. As shown in FIG. 4A, initially, a pointer class that points to a scalar class or a structure class is identified (Step 251). As discussed above, object safety analysis results in objects in the code, such as structure arrays and scalar arrays, being represented as alias classes (e.g., structure classes, pointer classes, lambda classes, etc.). Accordingly, alias classes that are pointer classes are identified and a determination is made whether the pointer points to a scalar class or a structure class. If the pointer class points to a scalar class or a structure class, then the pointer class is identified.

Further, a determination is made whether the scalar class or structure class is in an array class (Step 253). Specifically, a determination is made whether the scalar class or structure class is in an array class that is referenced by the pointer class. For example, a structure array may be referenced by a pointer. After object safety analysis, if the structure array is safe to transform, then the structure array is a structure class that is in an array class and referenced by the pointer class. If a determination is made that the scalar class or structure class is not in an array class, then a determination is made whether the class that is referenced by the pointer class in Step 251 is a structure class (Step 255). If the class is a structure class, then structure profitability analysis is performed and the structure class is transformed accordingly (Step 257). Performing the structure profitability analysis is described below in reference to FIG. 5. Otherwise, if the class that is referenced by the pointer class in Step 251 is a scalar class, then the method ends.

Returning to FIG. 4A and step 253, if the scalar class or the structure class is in an array class, then a determination is made whether another alias class references the pointer class (Step 259). Specifically, a determination is made whether the pointer class that references the scalar class or the structure class is in itself referenced by another alias class. For example, a pointer class may reference the pointer class that references the structure class. In such scenario, the processing of the pointer class may end because when the other alias class is processed, the processing of the other alias class may result in the processing of the pointer class.

If another alias class does not reference the pointer class, then variables, P and Q, are defined. P and Q are used to identify chains of references that include the pointer class. Specifically, Q is used in Steps 263-271 of FIG. 4A to identify the last alias class referenced in a chain of references, and P is used to identify the first alias class (i.e., the pointer class). For example, consider the scenario in which P is a pointer to pointer R and pointer R is a pointer to structure class S. In the example, Q identifies the chain of references to structure class S. Specifically, Q first equals P. Then, Q is equal to R. Finally, Q is set equal to S. Thus, Q iterates through the chain of references to structure class S. Accordingly, P is set as the pointer class. Further, Q is set to be equal to the pointer P (Step 261).

Accordingly, after setting Q to equal the pointer P, Q is set to equal the class referenced by Q (Step 263). Initially, on the first iteration, Q is set to equal the class referenced by P (e.g., the pointer class). In subsequent iterations, Q follows the chain of references to the next referenced alias class.

Next, a determination is made whether Q is a structure class in an array class (Step 265). If Q is a structure class in an array class, then a structure profitability analysis is performed in accordance with one or more embodiments of the invention (Step 267) and the method continues to FIG. 4B. The structure profitability analysis is described below in reference to FIG. 5.

Returning to Step 265, if Q is not a structure class in an array class, then a determination is made whether Q references another class (Step 269). For example, a determination may be made whether Q is a pointer class that points to another class. If Q does not reference another class, then the method continues to FIG. 4B.

Alternatively, if Q does reference another class, then a determination is made whether the class referenced by Q is a scalar class or a structure class that is not in an array class (Step 271). If Q is a scalar class or a structure class that is not in an array class, then the method continues with FIG. 4B. Alternatively, Q is set equal to the class referenced by Q (Step 263). Thus, the next class referenced in the referenced chain is checked for the conditions specified in Steps 265-271.

Continuing with FIG. 4B, a determination is made whether Q is a structure class with address based fully splitting (Step 273). Q is a structure class with address based fully splitting when the structure class that Q is equal to has already been processed and transformed. Specifically, the transformation of the structure class is address based fully splitting. If Q is not a structure class with address based fully splitting, then array collapse is performed from pointer P to pointer Q (Step 275). The array collapse optimization technique is described below in reference to FIG. 6.

Alternatively, if Q is a structure class with address based fully splitting, a determination is made whether Q has a field that is a pointer (Step 277). If Q does not have a field that is a pointer, then array collapse is performed from P to Q (Step 275). If Q does have a field that is a pointer, then T is set as the last alias class in the array class that is reachable in references by the field (Step 279). Further array collapse is performed from P to T (Step 281). Array collapse is described below in reference to FIG. 6.

Figure 5:
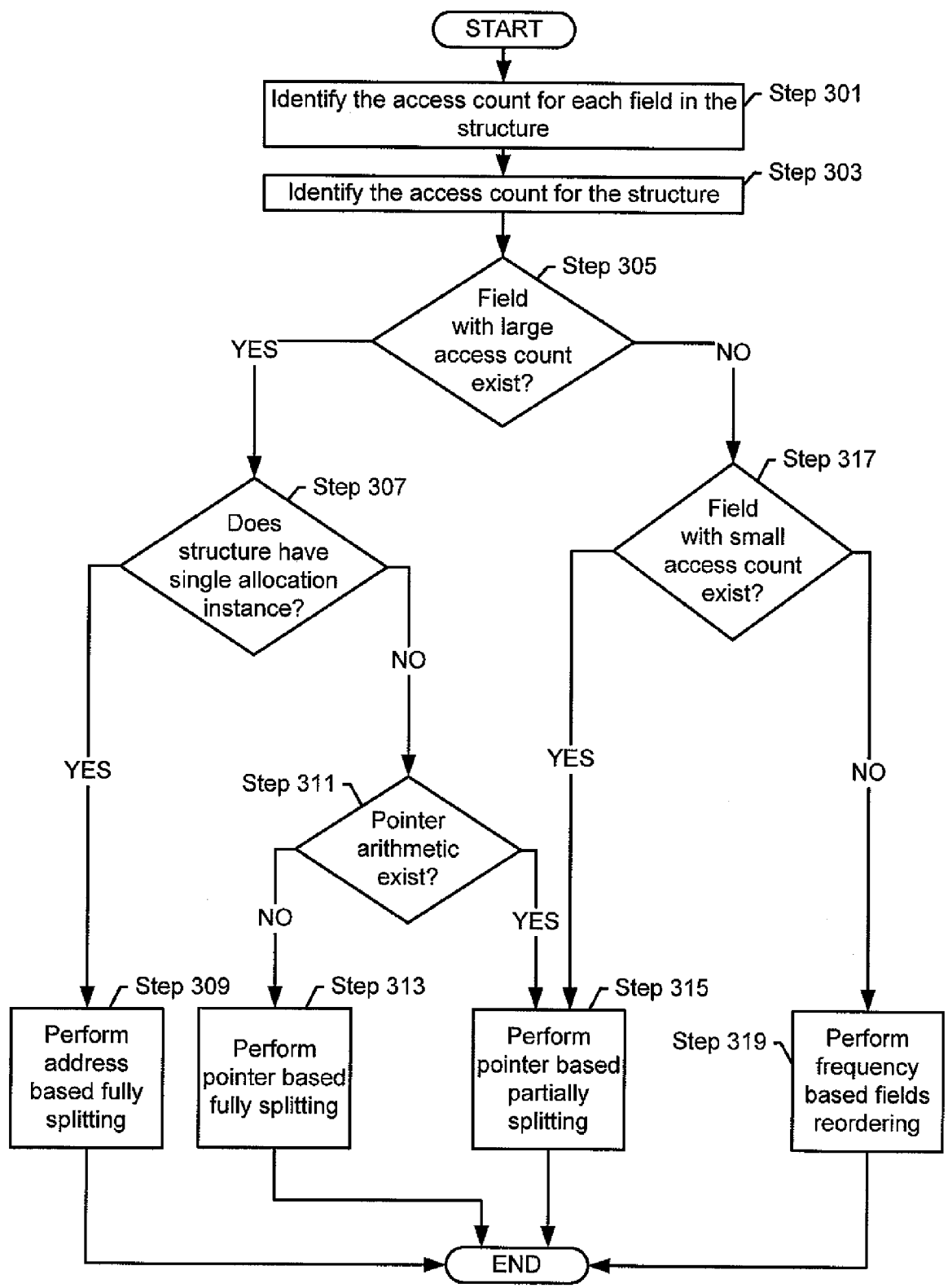

FIG. 5 is a flowchart of the structure profitability analysis and transforming the structure array in accordance with one or more embodiments of the invention. As shown in FIG. 5, initially, the access count for each field in the structure is identified (Step 301). Identifying an access count may be performed using any technique known in the art. For example, if a field is accessed within a loop, then the number of iterations of the loop is added to the access count for the field. If a field is accessed within nested loops, then the product of the number of iterations of each of the loops is added to the access count for the field.

Additionally, the access count for the structure is identified (Step 303). In one or more embodiments of the invention, to determine the access count for the structure, loops are identified that access more than half of the fields of the structure within the same iteration. Thus, the number of iterations of loops that access more than half of the fields is added to the access count for the structure. Additionally, if the loop is in a nested loop, then the product of the numbers of iterations of each of the nested loops is added to the access count for the structure.

A determination is made whether a field exists with a large access count (Step 305). A field has a large access count when the access count for the field is larger than the access count for the structure. For example, the access count for the field may be greater than five percent larger than the access count for the structure.

If a field with a large access count exists, then a determination is made whether the structure has a single allocation instance (Step 307). A structure has a single allocation instance when memory for the structure is allocated in a single statement of the code. If a structure has a single allocation instance, then address based structure fully splitting is performed (Step 309). Address based fully splitting may be performed by defining field arrays for each field of the structure. A field array is an array for the particular field. For example, a one field array, $f_1$ array, may be defined for all fields, $f_1$, in the structure array and a second field array, $f_2$ array, may be defined for all fields, $f_2$, in the structure array. Specifically, the only elements in a field array are the particular field of each structure in the structure array. In order to access each field array, each field array may be referenced by a global pointer variable. In one or more embodiments of the invention, the field arrays are combined into a single array. The code is transformed by identifying each access to the structure array and redefining the access to refer to the same element in the field array.

Continuing with FIG. 5, if a structure has multiple allocation instances, then a determination is made whether pointer arithmetic is used (Step 311). Pointer arithmetic is using arithmetic to change the value of a pointer rather than using indexing. If pointer arithmetic is not used, then pointer based fully splitting is performed (Step 313). Pointer based fully splitting involves creating a new structure or a pointer array in which the fields of the structure or the elements of the array reference an associated field array (described above). Thus, transforming the memory accesses for pointer based fully splitting includes defining the new structure or pointer array and creating field arrays for each field in the structure. Further, each access to the structure array is identified. The access is redefined to reference the same element in the appropriate field array.

Alternatively, if pointer arithmetic exists, then pointer based partially splitting is performed (Step 315). Performing pointer based partially splitting includes defining a frequently accessed structure and a rarely accessed structure. The frequently accessed structure contains the fields defined in the original structure that have a larger access count than the structure array. Conversely, the rarely accessed structure contains the fields that have a smaller access count than the structure array or the same access count as the structure array. Further, two new structure arrays are defined. The first structure array is defined for the frequently access structure while the second structure array is defined for the rarely accessed structure. Specifically, each element in the first field array is a frequently accessed structure, and each element in the second field array is a rarely accessed structure. In addition to the above, in order to access the first structure array or the second structure array, a new structure or new pointer array is defined that has elements or fields which reference the new structure arrays. Accesses to the structure array are redefined to access the appropriate element of the field array.

Returning to Step 305 of FIG. 5, if a determination is made that a field with a large access count does not exist, a determination is made whether a field with a small access count exists (Step 317). A field with a small access count exists when the number of accesses to the field is substantially less than the number of accesses to the structure array. In one or more embodiments of the invention, when the number of accesses to the structure array is at least five percent less than the number of accesses to the structure array, then the field is determined to have a small access count.

If a determination is made that a field with a small access count exists, then pointer based partially splitting is performed in accordance with one or more embodiments of the invention (Step 315). Performing pointer based partially splitting may be performed as discussed above with the frequently accessed structure containing the fields that have the same access count as the structure array and the rarely accessed structure containing the fields that have a small access count.

Otherwise, if a field with a large access count does not exist and a field with a small access count does not exist, the frequency-based fields reordering is performed (Step 319). Frequency-based fields reordering redefines the structure so that fields that are more frequently accessed are before fields in memory that are less frequently accessed. Performing frequency based fields reordering may include changing the order of the fields in the definition of the structure. Further, if pointer arithmetic is used, the pointer arithmetic may be adjusted for the change in locations of the fields.

Figure 6:
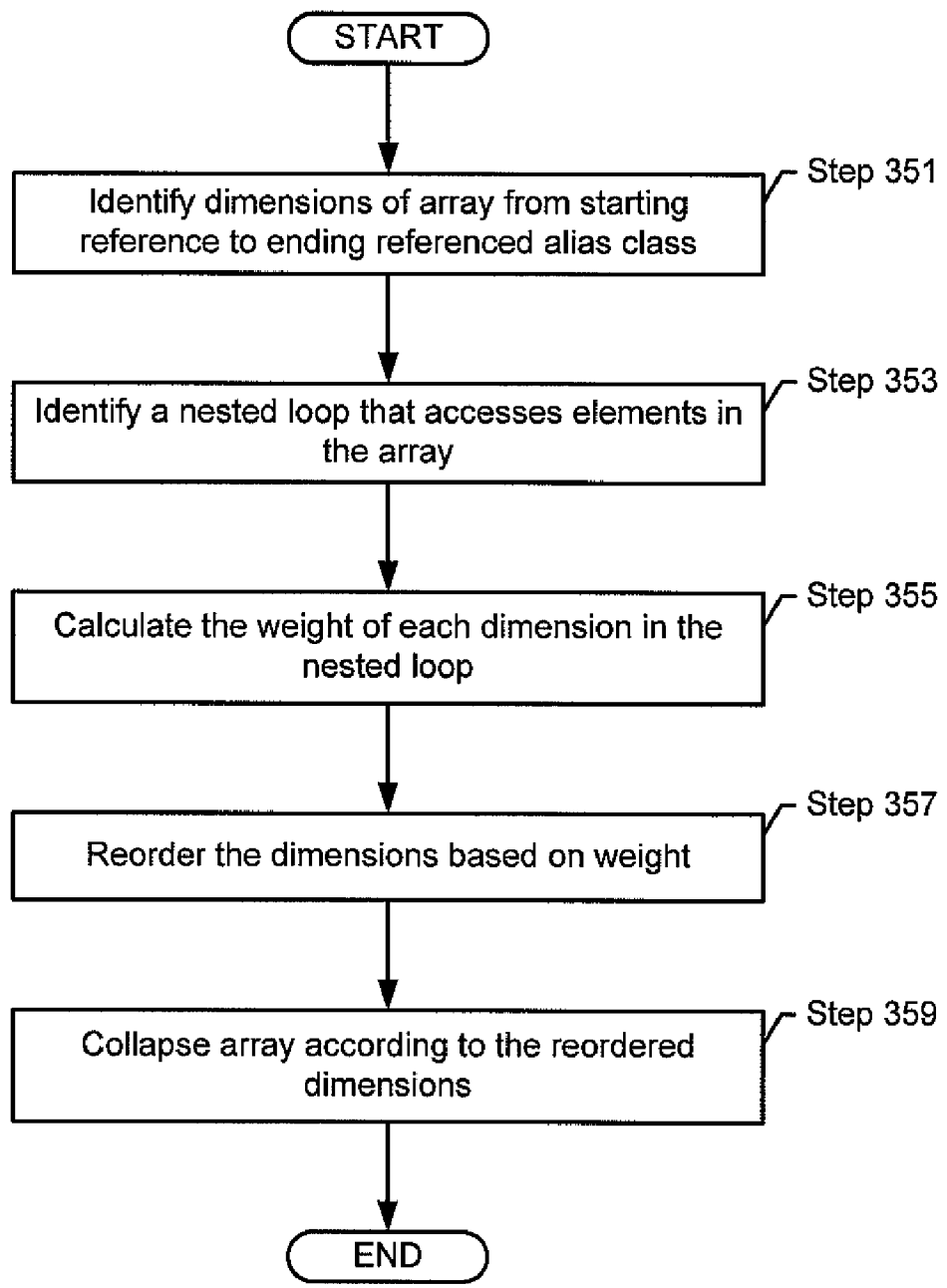

FIG. 6 shows a flowchart of a method for performing array collapse in accordance with one or more embodiments of the invention. Array collapse includes merging multiple arrays into a single array. Specifically, a new array is defined that includes all of the arrays referenced by the pointer array or a field of the structures in the structure array. Further, accesses to the elements of the multiple arrays are redefined to access the appropriate element in the single array.

Initially, a shown in FIG. 6, in order to perform array collapse, the dimensions of the array from the starting pointer and the ending referenced alias class is identified (Step 351). The dimensions of the array from the starting reference to the ending reference are the dimensions from P to Q or P to T as discussed above in reference to FIG. 4B. Next, a nested loop that accesses the elements in the array is identified (Step 353). Specifically, a nested loop (e.g., a nesting of "for" loops, a nesting of "while" loops, a nesting having a combination of types of loops, etc.) that iterates through the dimensions is identified.

Using the nested loop, the weight of each dimension in the nested loop is calculated (Step 355). The weight of each dimension is the product of the number of times that the nested loop iterates through the dimension and the size of the dimension. For example, consider the scenario in which an array p exists. Further, p has three dimensions: p[dim_1][dim_2][dim_3] in which dim is dimension. Additionally, dim_1 has five data elements, dim_2 has nine data elements, and dim_3 has seven data elements. In the example, p is referenced by the following pseudo code:

```
for (i = 0; i < 5; i++) {
    for (k = 0; k < 7; k++) {
        for (j = 0; j < 9; j++) {
            p[i][j][k] = x;
        }
    }
}
```

In the above example, dim_1 of p has a size of five which is iterated through once. Therefore, dim_1 has a weight of five. Dim_2 has a size of nine which is iterated through in the nested loop thirty-five times (i.e., seven*five). Therefore, dim_2 has a weight of three hundred fifteen (i.e., thirty-five*nine). Finally dim_3 has a size of seven which is iterated through in the nested loop five times. Therefore, dim_3 has a weight of thirty-five (i.e., five*even).

The dimensions are then reordered based on the weight (Step 359). In one or more embodiments of the invention, the dimensions are reordered according to ascending order. Thus, the dimension with the greatest weight has data elements closest to each other in memory. In the above example, because dim_1 has a weight of five, dim_2 has a weight of three hundred fifteen, and dim_3 has a weight of thirty-five, p[dim_1][dim_2][dim_3] may be reordered to p[dim_1][dim_3][dim_2]. In the example, because dim_2 has a weight of three hundred fifteen, the data elements of dim_2 are next to each other in memory.

Finally, the array is collapsed according to the reordered dimensions (Step 360). Specifically, rather than accessing each dimension with a multiple level pointer dereference, the dimensions are accessed with a single level pointer dereference. Collapsing an array may be performed using techniques well known in the art. In the above example, the statement p[i][j][k] may be collapsed to p[i*seven*nine+k*five+j]. Thus, only a single calculation and memory access is performed (i.e., i*seven*nine+k*five+j).

For example, consider the scenario in which m elements exist in the pointer array p. Further, in the example, each of the m elements reference a distinct array having n elements.

Thus, m distinct arrays are referenced by the pointer array. In the example, p[i] is the pointer to the pointer array of m elements. Each of the m elements has elements p[i][j]. In the example, the pointer array p may be collapsed into a single array q. Thus, the access of p[i][j] may be transformed into q[j*m+i].

In the process of performing array collapse, the single array is transformed such that elements that are accessed in sequence are next to each other in memory. Specifically, the data layout is transformed such that in nested loops, the elements next to each other are in the innermost loop. By transforming the data layout in memory, the order of the loops does not need to change. Further, if the data elements are structure arrays or referenced by structure arrays, then additional transformations may be performed.

FIGS. 7A-7J show examples in accordance with one or more embodiments of the invention. FIGS. 7A-7J are merely exemplary and not intended to limit the scope of the invention. For the example shown in FIGS. 7A-7J, consider the scenario in which a structure array has four elements: structure A, structure B, structure C, and structure D. Each element is a structure having three fields: $f_1$, $f_2$, $f_3$. The third field $f_3$ references another array (referred to as the $f_3$ array).

Figure 7A:
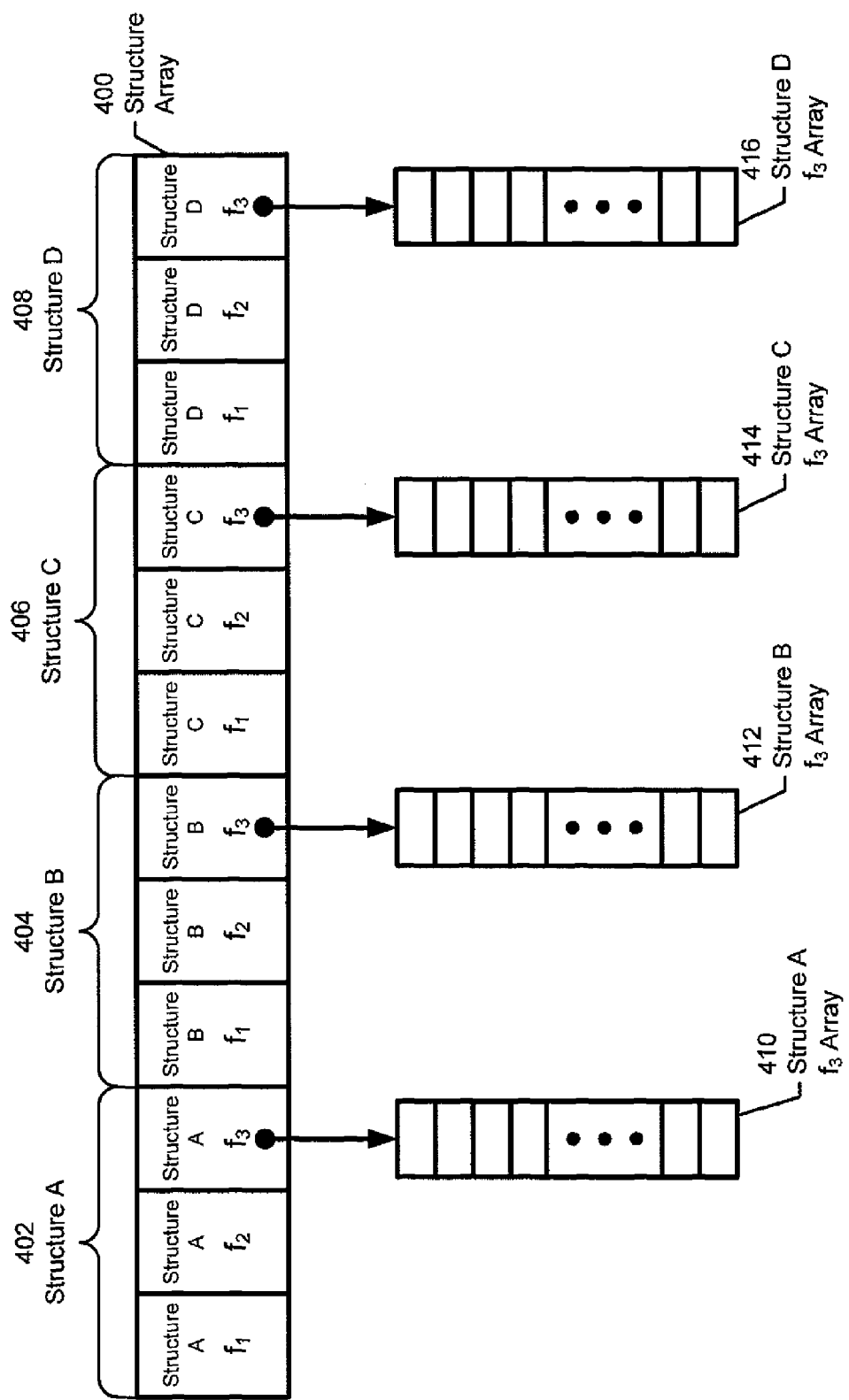
FIGS. 7A-7J show examples in accordance with one or more embodiments of the invention.

FIG. 7A shows an example memory layout of a structure array (400) when the source code is compiled and executed without memory optimization. As shown in the example, structure A (402) is adjacent to structure B (404), structure B (404) is adjacent structure C (406), and structure C (406) is adjacent to structure D (408). In addition, all of the fields of the structure A (402) are followed by all of the fields of structure B (404), which are followed by all of the fields of structure C (406), which are followed by all of the fields of structure D (408). Further, structure A f3 references structure A f3 array (410), structure B f3 references structure B f3 array (412), structure C f3 references structure C f3 array (414), and structure D f3 references structure D f3 array (416).

Figure 7B:
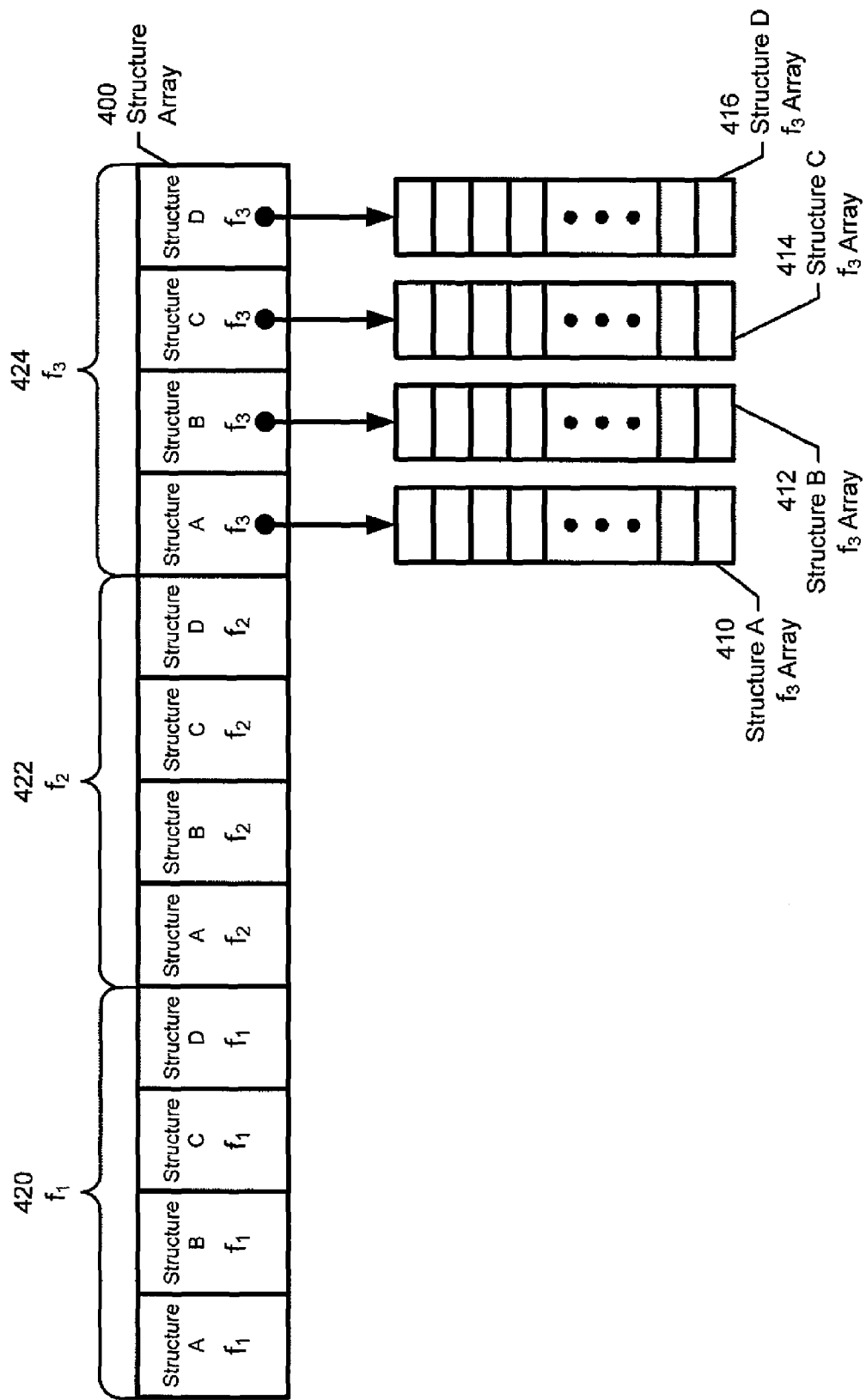

FIG. 7B shows an example memory layout of the structure array with address based fully splitting in accordance with one or more embodiments of the invention. As shown in FIG. 7B, the field $f_1$ for all of the structures (420) (i.e., structure A ft, structure B $f_1$, structure C ft, structure D ft) are grouped into adjacent locations of memory, the field $f_2$ for all of the structures (422) (i.e., structure A $f_2$, structure B $f_2$, structure C $f_2$, structure D $f_2$) are grouped into adjacent locations of memory, and the field $f_3$ for all of the structures (424) (i.e., structure A $f_3$, structure B $f_3$, structure C $f_3$, structure D $f_3$) are grouped into adjacent locations of memory. Memory access is faster using the address based fully splitting when fields from different structures are consecutively accessed rather than when fields from the same structure are consecutively accessed. Specifically, by grouping the fields according to access, embodiments of the invention exploit cache locality achieved from the grouped fields.

Figure 7C:
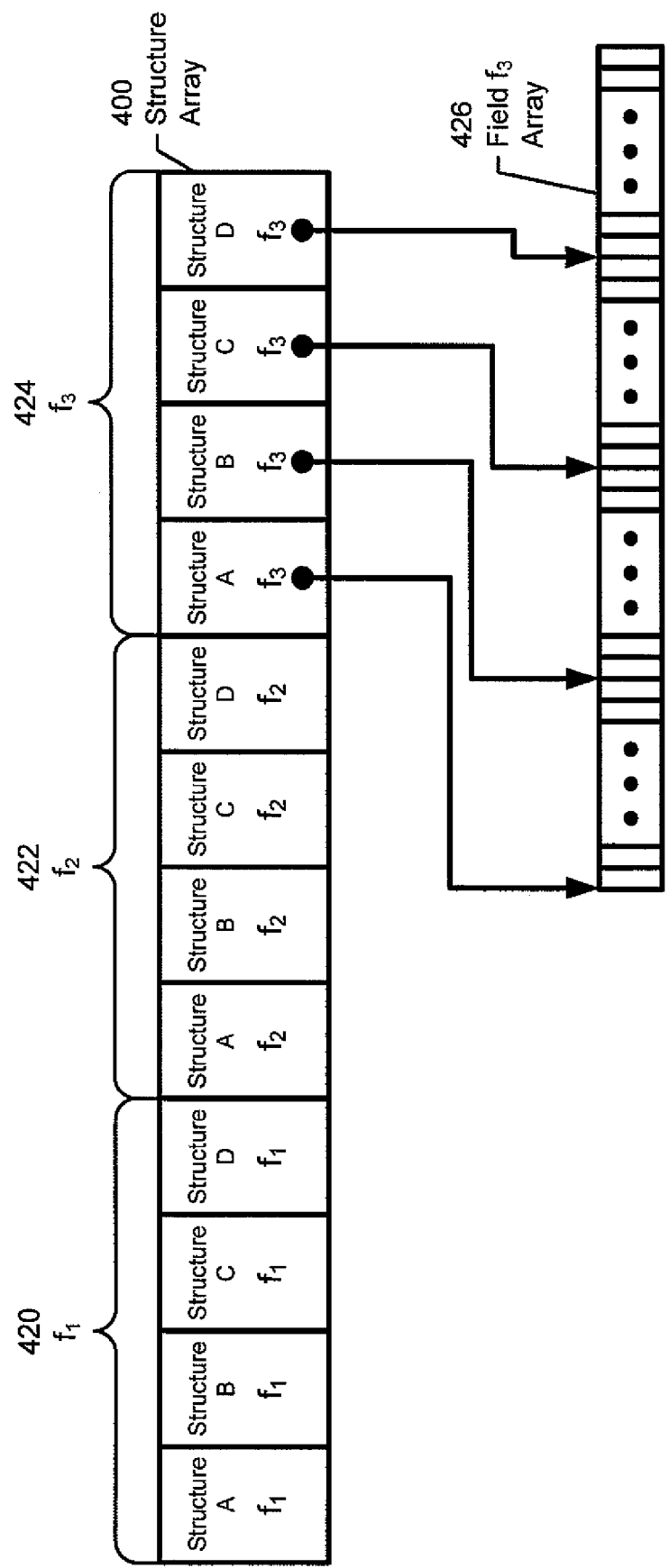

FIG. 7C shows an example memory layout of the structure array with address based fully splitting and array collapse in accordance with one or more embodiments of the invention. As shown in FIG. 7C, the fields are grouped into adjacent locations of memory similar to FIG. 7B. Further, the structure field arrays (e.g., structure A $f_3$ array (410), structure B $f_3$ array (412), structure C $f_3$ array (414), and structure D $f_3$ array (416)) are collapsed into a single field $f_3$ array (426). When different field arrays are consecutively accessed, embodiments of the invention exploit cache locality achieved by grouping the structure field arrays into a single field array.

Figure 7D:
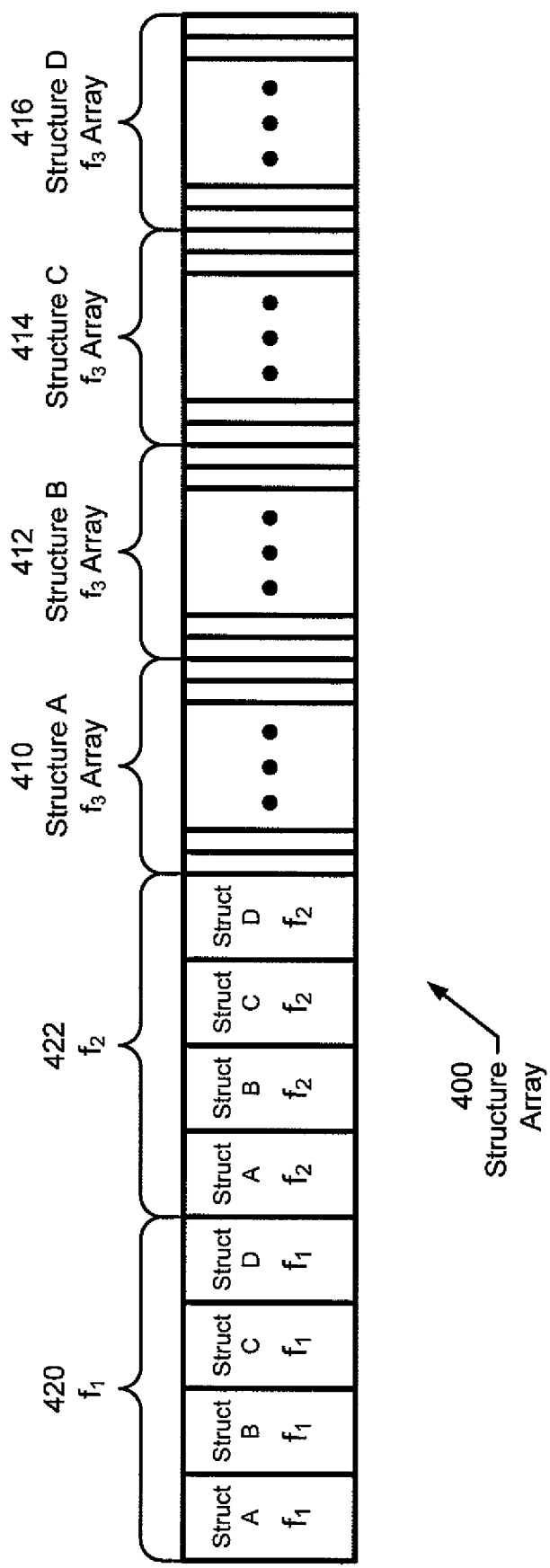

FIG. 7D shows an example memory layout of the structure array with address based fully splitting and array collapse into the structure array (400) in accordance with one or more embodiments of the invention. As shown in FIG. 7C, the $f_1$ field (420) and $f_2$ field (422) are grouped into adjacent locations of memory similar to FIG. 7B. However, the pointer references of the $f_3$ field are removed, and the structure field arrays (e.g., structure A $f_3$ array (410), structure B $f_3$ array (412), structure C $f_3$ array (414), structure D $f_3$ array (416)) are combined with the structure array 400. When different field arrays are consecutively accessed, embodiments of the invention exploit cache locality achieved by grouping the structure field arrays into a single field array.

Figure 7E:
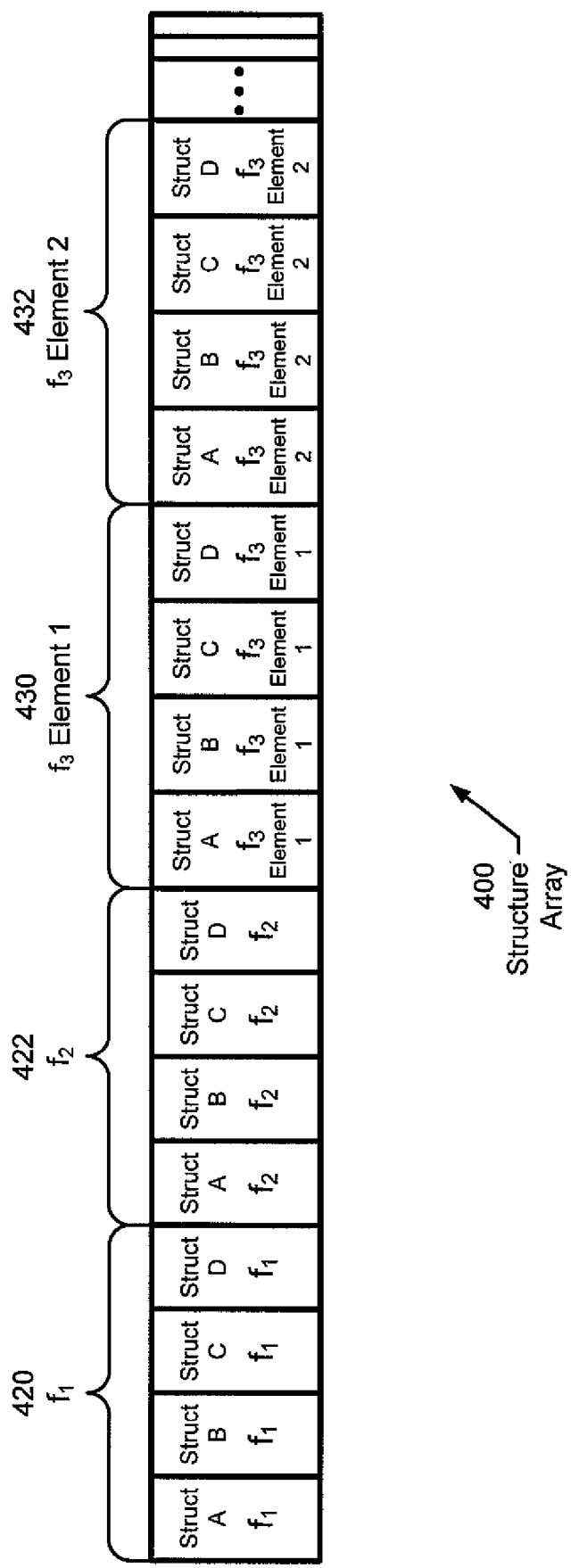

FIG. 7E shows an example memory layout of the structure array with address based fully splitting and array collapse into the structure array in accordance with one or more embodiments of the invention similar to FIG. 7D. Additionally, as shown in FIG. 7E, address based fully splitting is performed on the field arrays. Thus, as shown in FIG. 7E, the first elements of the field arrays (430) are grouped into adjacent locations of memory, the second elements of the field arrays (432) are grouped into adjacent locations of memory, etc. Additionally, address based fully splitting may also be performed when the elements are structures.

Figure 7F:
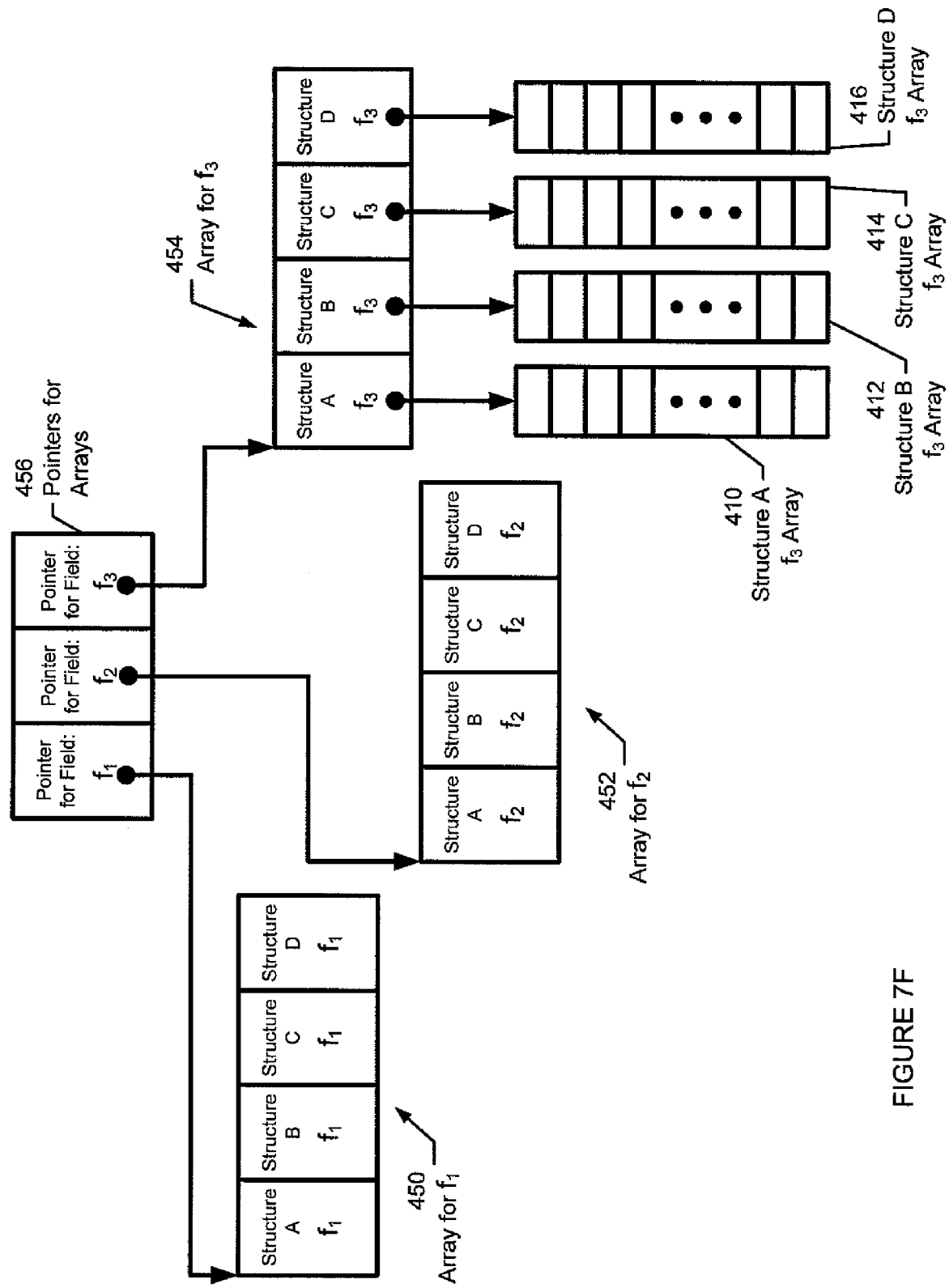

FIG. 7F shows an example memory layout of the structure array with pointer based fully splitting in accordance with one or more embodiments of the invention. As shown in FIG. 7F, the $f_1$ fields for all of the structures (i.e., structure A $f_1$, structure B $f_1$, structure C $f_1$, structure D $f_1$) are grouped into an array for $f_1$ (450), the $f_2$ fields for all of the structures (i.e., structure A $f_2$, structure B $f_2$, structure C $f_2$, structure D $f_2$) are grouped into an array for $f_2$ (452), and the $f_3$ fields for all of the structures (i.e., structure A $f_3$, structure B $f_3$, structure C $f_3$, structure D $f_3$) are grouped into an array for $f_1$ (454). Additionally, pointers to each array of the fields are grouped into a single structure (456). Memory access is faster using the pointer based fully splitting when the program consecutively accesses fields from different structures rather than fields from the same structure. Additionally, pointer based fully splitting allows for multiple memory allocations of the same structure array. Specifically, pointer based fully splitting may be performed when different instances of the structure array simultaneously exist.

Figure 7G:
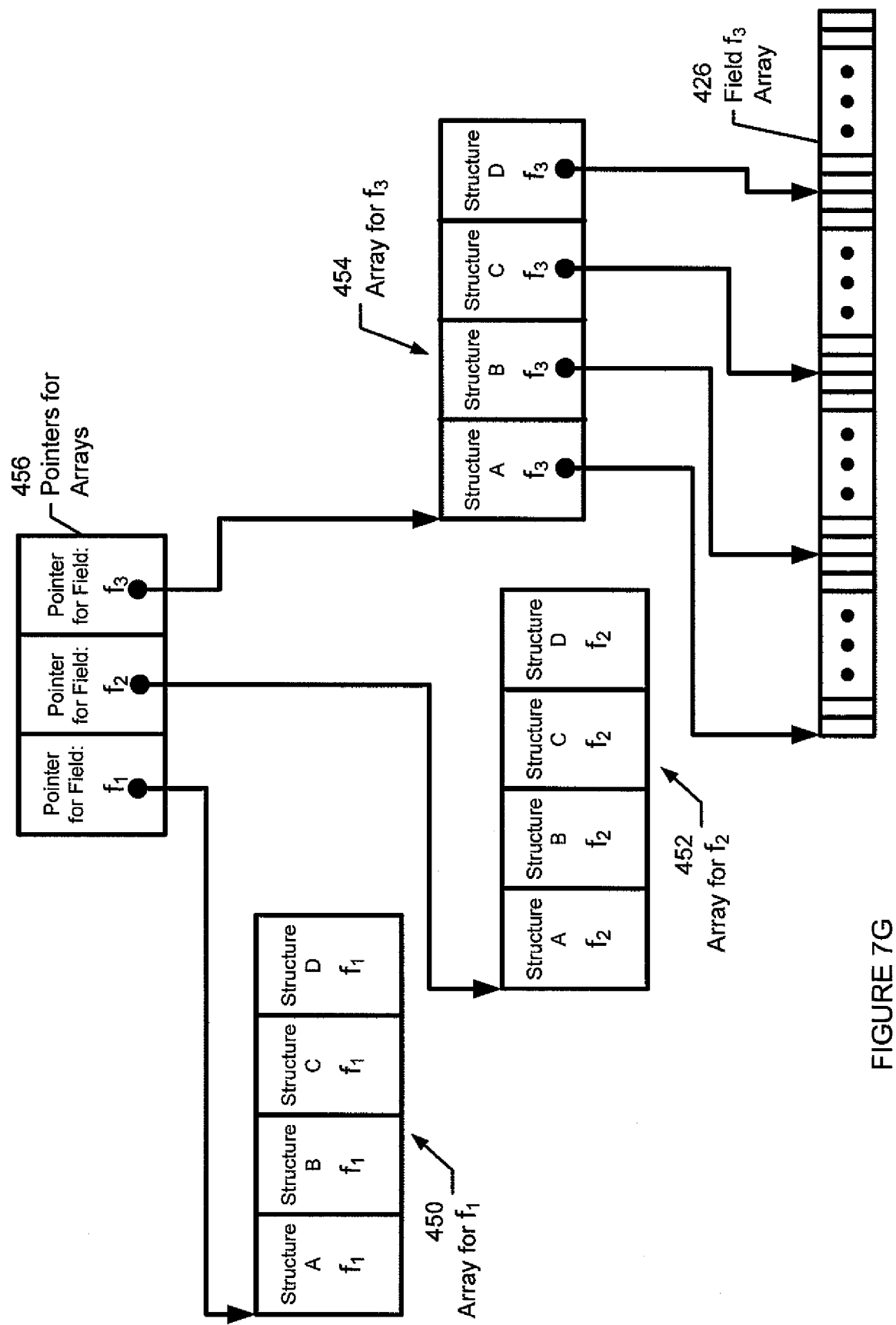

FIG. 7G shows an example memory layout of the structure array with pointer based fully splitting and array collapse in accordance with one or more embodiments of the invention. As shown in FIG. 7G, the fields are grouped into adjacent locations of memory similar to FIG. 7F. Further, the structure field arrays (e.g., structure A $f_3$ array (410), structure B $f_3$ array (412), structure C $f_3$ array (414), structure D $f_3$ array (416)) are joined into a single field $f_3$ array (426). When different field arrays are consecutively accessed, embodiments of the invention exploit cache locality achieved by grouping the structure field arrays into a single field array.

Figure 7H:
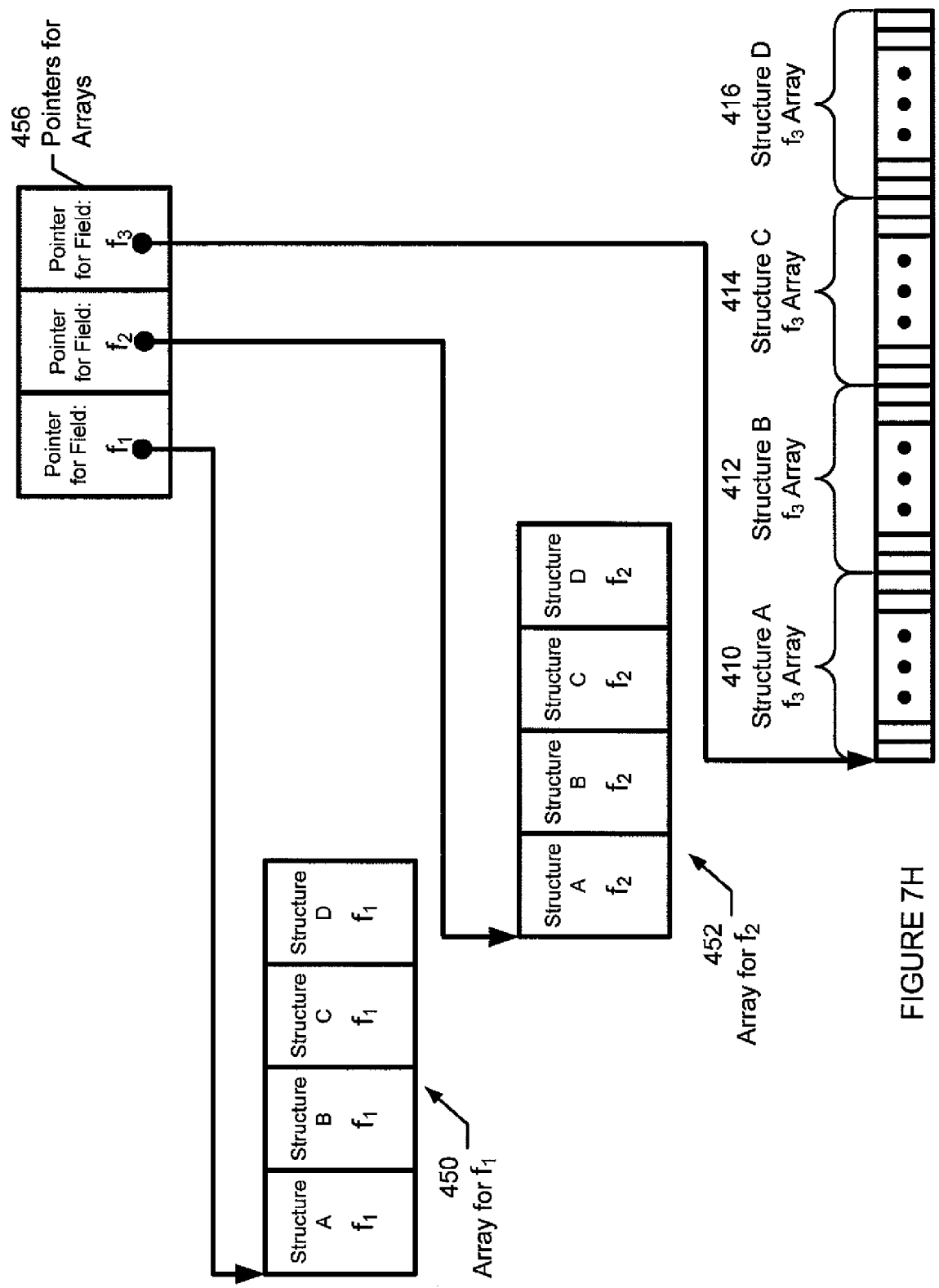

FIG. 7H shows an example memory layout of the structure array with pointer based fully splitting and array collapse into a single array in accordance with one or more embodiments of the invention. As shown in FIG. 7H, the fields are grouped into adjacent locations of memory similar to FIG. 7G. Further, rather than having a field $f_3$ array (as shown in FIG. 7G), the structure field arrays (e.g., structure A $f_3$ array (410), structure B $f_3$ array (412), structure C $f_3$ array (414), structure D $f_3$ array (416)) are joined into a single array and directly referenced by the pointers for the arrays (456).

Figure 7I:
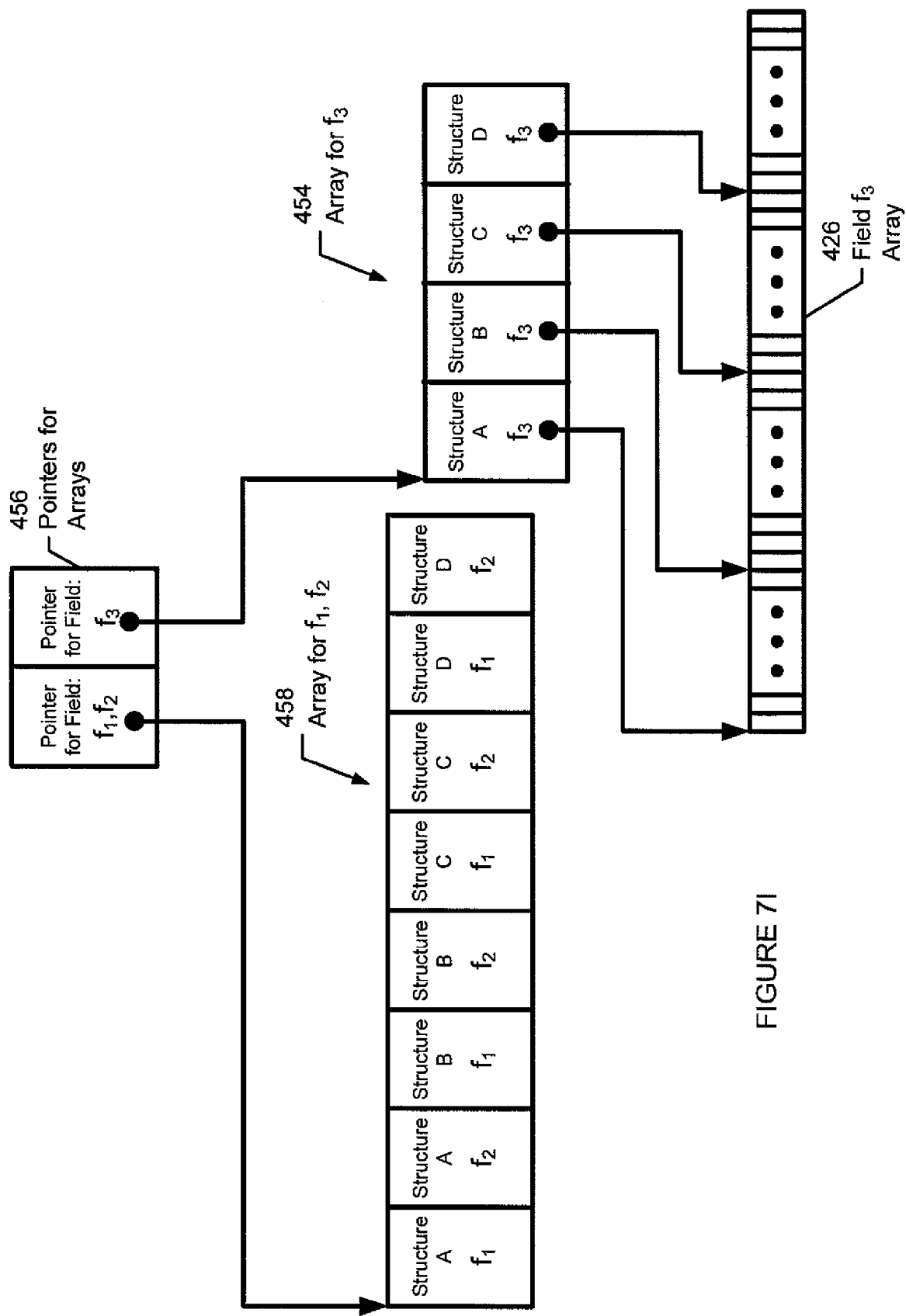

FIG. 7I shows an example memory layout of the structure array with pointer based partially splitting and array collapse in accordance with one or more embodiments of the invention. As shown in FIG. 7I, the $f_3$ fields are grouped into adjacent locations of memory similar to FIG. 7F. Further, the structure field arrays (e.g., structure A $f_3$ array (410), structure B $f_3$ array (412), structure C $f_3$ array (414), structure D $f_3$ array (416)) are joined into a single field $f_3$ array (426). However, field 1 and field 2 are not grouped separately. Rather, field 1 and field 2 are grouped into an array that encompasses both field 1 and field 2 (458). Specifically, field 1 and field 2 are still in the order of the original structure array. Therefore, in the scenario in which field 1 and field 2 are accessed much more than field 3 or field 3 is accessed much more than field 1 and field 2, embodiments of the invention exploit cache locality achieved by pointer based partially splitting.

Figure 7J:
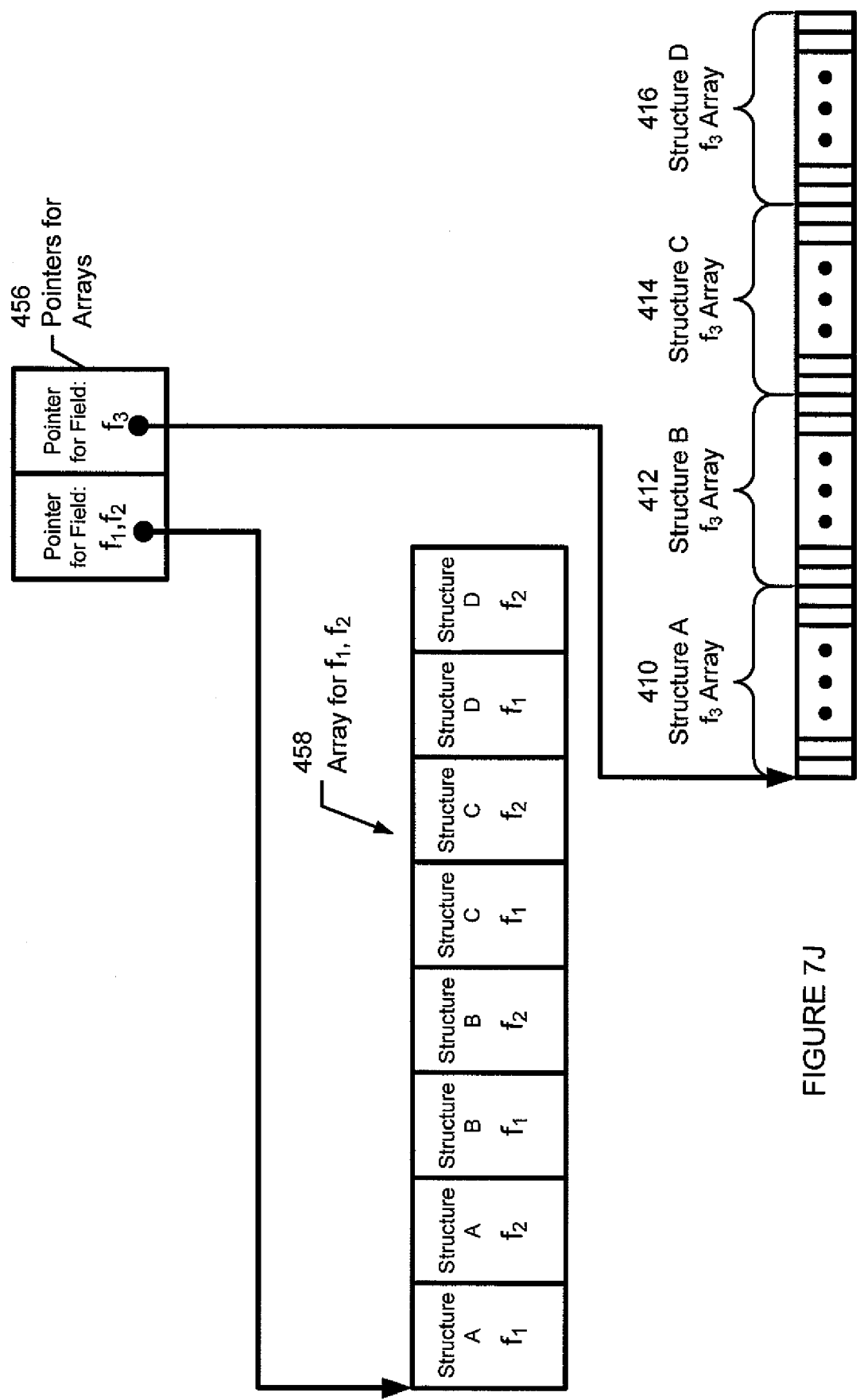

FIG. 7J shows an example memory layout of the structure array with pointer based partially splitting and array collapse into a single array in accordance with one or more embodiments of the invention. As shown in FIG. 7J, the fields are grouped into adjacent locations of memory similar to FIG. 7I. Further, rather than having a field $f_3$ array (as shown in FIG. 7J), the structure field arrays (e.g., structure A $f_3$ array (410), structure B $f_3$ array (412), structure C $f_3$ array (414), structure D $f_3$ array (416)) are joined into a single array and directly referenced by the pointers for the arrays (456).

The following is an example of how a compiler may modify the memory layout of a structure array specified in a program. The following is merely for exemplary purposes and not intended to limit the scope of the invention. Further, one skilled in the art will appreciate that while in the below code sample, instructions are in a programming language similar to C, any programming language may be used. Further, the resulting code, while shown in the same programming language, is merely in the programming language for clarification purposes to allow for comparison between source code and the final result. Additionally, lines of code have been removed in order to avoid unnecessarily complicating the example.

Consider the scenario in which the source code is:

```
1.   struct str
2.   {
3.       int f1;
4.       int f2;
5.       int *f3;
6.   };
7.   p = (struct str*) malloc( m * sizeof(struct str) );
8.   for (i=0;i<m;i++)
9.       p[i].f3 = malloc(n * sizeof(int));
10.  q = p + sizeof(struct str);
11.  y->f2
12.  x->f3[i]
```

As shown above, lines 1 through 6 define a structure, str, having three fields, f1, f2, f3. The first two fields, f1 and f2, are integers while the last field, f3, is a pointer. In line 7, space is allocated for an array having m elements in which each element is a structure of type str. Further, in line 7, pointer p references the starting address of the array. Lines 8 and 9 of the above source code define that the field f3 of each structure in the array references another array having n elements in which each element is an integer. Line 10 stores the address of the first field of the second structure into variable q. Line 11 accesses f2 of a structure y in the structure array. Line 12 accesses the integer at position i in the field array referenced by f3 of structure x.

Next, consider the scenario in which the source code is transformed with array collapse. For comparison purposes, the below code is shown in the same language as the source code. However, one skilled in the art will appreciate that this is only for comparison.

```
1.   struct str
2.   {
3.       int f1;
4.       int f2;
5.       int *f3;
6.   };
7.   p = (struct str*) malloc( m * sizeof(struct str) );
8.   r = (int*)malloc(m*n*sizeof(int));
9.   for (i=0;i<m;i++)
10.      p[i].f3 = r+i*n;
11.  q = p + sizeof(struct str);
12.  y->f2
13.  x->f3[i]
```

As shown in the example transformation above, a new array is created, r, that includes all of the field arrays referenced by the f3 of each structure in the structure array p. Thus, in line 10, rather than creating new memory for the f3 array, the structure references the appropriate position in the single field array (i.e., "r+i*n" where r is the base address of the single field array, i is the number of the structure, and n is the number of elements in each field array).

In the next modification, consider the scenario in which address based fully splitting is used in conjunction with array collapse. As discussed above, for comparison purposes the below code is shown in the same language as the source code.

```
1.   struct str
2.   {
3.       int f1;
4.   };
5.   p = (struct str*) malloc( m * sizeof(struct str) );
6.   r = (int*)malloc(m*n*sizeof(int));
7.   p_f1 = p
8.   p_f2 = p+new_size(f1)*m, where new_size(f1)=offsetof(f2) - offsetof(f1);
9.   p_f3 = p+new_size(f2)*m, where new_size(f2)=offsetof(f3) - offsetof(f2);
10.  q = p + sizeof(struct str);
11.  *(p_f2 + (y-p)/new_size(f1)*new_size(f2))
12.  *(*(p_f3+(x-p)/new_size(f1)*new_size(f2)) + i*sizeof(int))
```

As shown in the example transformation above, a new array is created, r, that includes all of the field arrays referenced by the third field of each structure in the structure array p. Further, the structure array is grouped by fields (as shown in the example of FIG. 7C above). The starting addresses of f1, f2, and f3 in the structure array p are specified by p_f1, p_f2, and p_f3, respectively. Lines 7-9 show the calculation that may be performed to identify the starting addresses for p_f1, p_f2, and p_f3, respectively. One skilled in the art will appreciate that the size of each field may change during compilation. Specifically, data structure alignment may be performed that changes the size of each field. Line 13 is a transformation of Line 11 in the source code. In Line 11 above, y references the starting address of f1 in the transformed memory layout for the structure corresponding to y in line 11 of the source code. Thus, y->f2 may be transformed to *(p_f2+(y-p)/new_size(f1)*new_size(f2)) to reference the same position in the transformed memory layout. Similarly, x->f3[i] in the source code may be transformed to *(*(p_f3+(x-p)/new_size(f1)*new_size(f2))+i*sizeof(int)) to reference the same position in the transformed memory layout.

In the next modification, consider the scenario in which address based fully splitting is used in conjunction with array collapse into the structure array. As discussed above, for comparison purposes the below code is shown in the same language as the source code.

```
1.   struct str
2.   {
3.       int f1;
4.   };
5.   p = malloc( m* (sizeof(struct str) + n*sizeof(int)) );
6.   p__f1 = p
7.   p__f2 = p+new__size(f1)*m, where new__size(f1)=offsetof(f2) −
     offsetof(f1);
8.   p__f3 = p+new__size(f2)*m, where new__size(f2)=offsetof(f3) −
     offsetof(f2);
9.   q = p + sizeof(struct str);
10.  *(p__f2 + (y−p)/new__size(f1)*new__size(f2))
11.  *((p__f3+(x−p)/new__size(f1)*new__size(f2)) + i*sizeof(int)*m)
```

As shown in the example transformation above, the structure array p includes the array r for each field referenced by the field array. Further, the structure array is grouped by fields (as shown in the example of FIG. 7C above). The starting addresses of f1, f2, and f3 arrays in the structure array p are specified by p_f1, p_f2, and p_f3, respectively. Lines 6-8 show the calculation that may be performed to identify the starting addresses for p_f1, p_f2, and p_f3, respectively, to account for data structure alignment. Line 11 in the above transformed code shows a transformation from line 12 in the source code. As shown above, x−>f3[i] in the source code may be transformed to 11. *((p_f3+(x−p)/new_size/(f1)* new_size(f2))+i*sizeof(int)*m) to reference the same position in the transformed memory layout.

As stated above, the examples are only intended for exemplary purposes. Other transformations and modifications may occur in different embodiments of the invention and depending on the source code.

Figure 8:
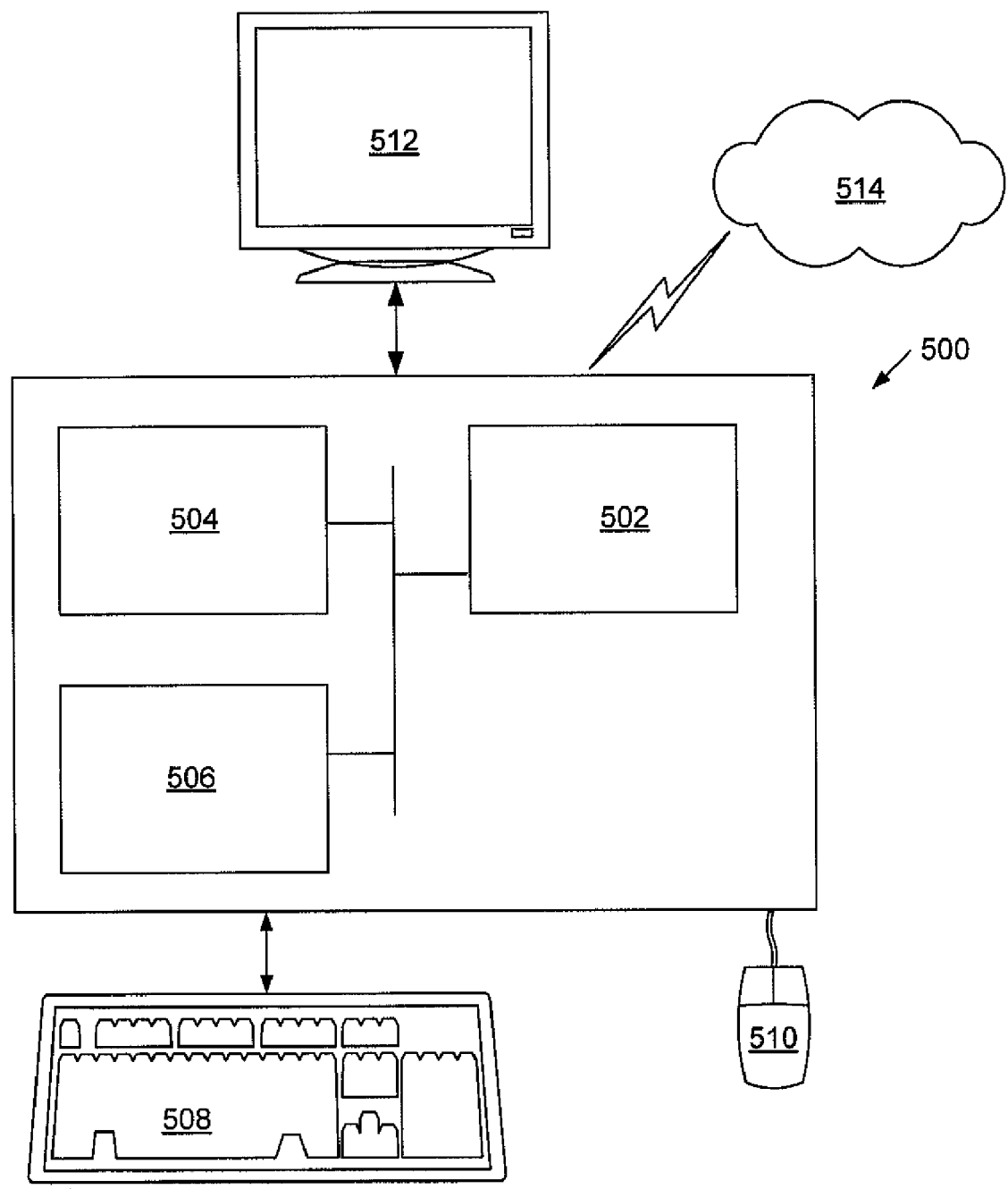
FIG. 8 shows a computer system in accordance with one or more embodiments of the invention.

Embodiments of the invention may be implemented on virtually any type of computer regardless of the platform being used. For example, as shown in FIG. 8, a computer system (500) includes a processor (502), associated memory (504), a storage device (506), and numerous other elements and functionalities typical of today's computers (not shown). The computer (500) may also include input means, such as a keyboard (508) and a mouse (510), and output means, such as a monitor (512). The computer system (500) is connected to a local area network (LAN) or a wide area network (e.g., the Internet) (514) via a network interface connection (not shown). Those skilled in the art will appreciate that these input and output means may take other forms.

Further, those skilled in the art will appreciate that one or more elements of the aforementioned computer system (500) may be located at a remote location and connected to the other elements over a network. Further, embodiments of the invention may be implemented on a distributed system having a plurality of nodes, where each portion (e.g., compiler, memory, etc.) may be located on a different node within the distributed system. In one embodiment of the invention, the node may be a computer system. Alternatively, the node may be a processor with associated physical memory. The node may alternatively be a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for transforming access to a structure array, comprising:
   compiling source code, wherein compiling the source code comprises:
      identifying the structure array in the source code;
      performing an object safety analysis to determine whether the structure array is safe for transformation, wherein the object safety analysis comprises an interprocedural alias class analysis;
      performing a profitability analysis on the structure array when the structure array is safe for transformation, wherein the profitability analysis comprises:
         selecting a transformation from a plurality of transformations, wherein the plurality of transformations comprises a pointer based fully splitting transformation, a pointer based partially splitting transformation, and an address based fully splitting transformation,
         identifying an access count for a first field of the structure array, and
         identifying an access count for the structure array,
         wherein the profitability analysis indicates to perform:
            pointer based partially splitting when the access count for the first field of the structure array is a threshold amount less than the access count for the structure array;
            address based fully splitting when the access count for the first field of the structure array is a threshold amount greater than the access count for the structure array and the structure array has a single allocation instance;
            pointer based fully splitting when the access count for the first field of the structure array is a threshold amount greater than the access count for the structure array and pointer arithmetic is not used to access the structure array; and
            pointer based partially splitting when the access count for the first field of the structure array is a threshold amount greater than the access count for the structure array and pointer arithmetic is used to access the structure array; and
      performing the selected transformation on the structure array; and
   storing the compiled code.

2. The method of claim 1, wherein performing the selected transformation further comprises performing array collapsing on a first array referenced in a first structure of the structure array and a first array referenced in a second structure of the structure array.

3. The method of claim 2, wherein the first array referenced in a first structure and the first array referenced in a second structure are collapsed into the structure array.

4. The method of claim 1, wherein performing the selected transformation comprises transforming accesses to the structure array such that a first field of a first structure in the structure array and a first field of a second structure in the structure array are accessed in adjacent memory locations, and a first array referenced by a second field of the first structure and a first array referenced by a second field of the second structure are accessed in adjacent memory locations.

5. The method of claim 1, wherein performing the selected transformation comprises:
   defining a first reference to a first field array and a second reference to a second field array; and transforming accesses to the structure array such a first field of a first structure in the structure array and a first field of a second structure in the structure array are accessed from the first field array and a second field of the first structure and a second field of the second structure are accessed from the second field array.

6. The method of claim 5, wherein transforming accesses to the structure array further comprises:
transforming accesses such that a third field of the first structure in the structure array and a third field of the second structure in the structure array are accessed from the first field array.

7. The method of claim 5, wherein performing the selected transformation comprises:
defining a structure comprising the first reference and the second reference.

8. The method of claim 1, wherein performing the object safety analysis comprises:
for each operation of a plurality of operations in the source code:
identifying an alias class of a plurality of alias classes for each object in the operation;
merging alias classes based on the operation;
determining whether to reassign an alias class to an object in the operation; and
reassigning the alias class to the object based on the determination,
wherein the alias class assigned to the structure array indicates whether the structure array is safe for transformation.

9. A computer system, comprising:
a processor;
a memory; and
instructions stored in memory for causing the computer system to:
compile source code, wherein compiling the source code comprises:
identifying a structure array in the source code;
performing an object safety analysis to determine whether the structure array is safe for transformation, wherein the object safety analysis comprises an inter-procedural alias class analysis;
performing a profitability analysis on the structure array when the structure array is safe for transformation, wherein the profitability analysis comprises:
selecting a transformation from a plurality of transformations, wherein the plurality of transformations comprises a pointer based fully splitting transformation, a pointer based partially splitting transformation, and an address based fully splitting transformation,
identifying an access count for a first field of the structure array, and
identifying an access count for the structure array, wherein the profitability analysis indicates to perform:
pointer based partially splitting when the access count for the first field of the structure array is a threshold amount less than the access count for the structure array;
address based fully splitting when the access count for the first field of the structure array is a threshold amount greater than the access count for the structure array and the structure array has a single allocation instance;
pointer based fully splitting when the access count for the first field of the structure array is a threshold amount greater than the access count for the structure array and pointer arithmetic is not used to access the structure array; and
pointer based partially splitting when the access count for the first field of the structure array is a threshold amount greater than the access count for the structure array and pointer arithmetic is used to access the structure array; and
performing the selected transformation on the structure array; and
store the compiled code.

10. The computer system of claim 9, wherein performing the selected transformation further comprises performing array collapsing on a first array referenced in a first structure of the structure array and a first array referenced in a second structure of the structure array.

11. The computer system of claim 10, wherein the first array referenced in a first structure and the first array referenced in a second structure are collapsed into the structure array.

12. The computer system of claim 9, wherein performing the selected transformation comprises transforming accesses to the structure array such that a first field of a first structure in the structure array and a first field of a second structure in the structure array are accessed in adjacent memory locations, and a first array referenced by a second field of the first structure and a first array referenced by a second field of the second structure are accessed in adjacent memory locations.

13. The computer system of claim 9, wherein performing the selected transformation comprises:
defining a first reference to a first field array and a second reference to a second field array; and
transforming accesses to the structure array such a first field of a first structure in the structure array and a first field of a second structure in the structure array are accessed from the first field array and a second field of the first structure and a second field of the second structure are accessed from the second field array.

14. The computer system of claim 13, wherein transforming accesses to the structure array further comprises:
transforming accesses such that a third field of the first structure in the structure array and a third field of the second structure in the structure array are accessed from the first field array.

15. The computer system of claim 13, wherein performing the selected transformation comprises:
defining a structure comprising the first reference and the second reference.

16. The computer system of claim 9, wherein performing the object safety analysis comprises:
for each operation of a plurality of operations in the source code:
identifying an alias class of a plurality of alias classes for each object in the operation;
merging alias classes based on the operation;
determining whether to reassign an alias class to an object in the operation; and
reassigning the alias class to the object based on the determination,
wherein the alias class assigned to the structure array indicates whether the structure array is safe for transformation.

17. A non-transitory computer readable medium comprising computer readable program code embodied therein for causing a computer system to:

compile source code, wherein compiling the source code comprises:

identifying a structure array in the source code;

performing an object safety analysis to determine whether the structure array is safe for transformation, wherein the object safety analysis comprises an interprocedural alias class analysis;

performing a profitability analysis on the structure array when the structure array is safe for transformation, wherein the profitability analysis comprises:

selecting a transformation from a plurality of transformations, wherein the plurality of transformations comprises a pointer based fully splitting transformation, a pointer based partially splitting transformation, and an address based fully splitting transformation, identifying an access count for a first field of the structure array, and identifying an access count for the structure array, wherein the profitability analysis indicates to perform:

pointer based partially splitting when the access count for the first field of the structure array is a threshold amount less than the access count for the structure array;

address based fully splitting when the access count for the first field of the structure array is a threshold amount greater than the access count for the structure array and the structure array has a single allocation instance;

pointer based fully splitting when the access count for the first field of the structure array is a threshold amount greater than the access count for the structure array and pointer arithmetic is not used to access the structure array; and pointer based partially splitting when the access count for the first field of the structure array is a threshold amount greater than the access count for the structure array and pointer arithmetic is used to access the structure array; and performing the selected transformation on the structure array; and store the compiled code.

* * * * *